US012579931B2

(12) United States Patent
Jeong et al.

(10) Patent No.: US 12,579,931 B2
(45) Date of Patent: Mar. 17, 2026

(54) SCAN DRIVING CIRCUIT AND DISPLAY DEVICE

(71) Applicant: SAMSUNG DISPLAY CO., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/014,371

(22) Filed: Jan. 9, 2025

(65) Prior Publication Data

US 2025/0336334 A1 Oct. 30, 2025

(30) Foreign Application Priority Data

Apr. 29, 2024 (KR) ........................ 10-2024-0056541

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/0267* (2013.01); *G09G 2310/0286* (2013.01); *G09G 2310/06* (2013.01); *G09G 2330/023* (2013.01)

(58) Field of Classification Search
CPC ............. G09G 3/32; G09G 2300/0842; G09G 2300/0819; G09G 2310/06; G09G 2310/0267; G09G 2310/0286; G09G 2330/023
See application file for complete search history.

(56) References Cited

U.S. PATENT DOCUMENTS

| | | | |
|---|---|---|---|
| 11,308,888 B2 | 4/2022 | Yuan et al. | |
| 11,929,033 B2 | 3/2024 | Kim et al. | |
| 2019/0035322 A1* | 1/2019 | Kim | H10D 86/60 |
| 2022/0366855 A1* | 11/2022 | Chang | G09G 3/3266 |
| 2023/0206852 A1* | 6/2023 | Kim | G09G 3/3233 345/204 |

FOREIGN PATENT DOCUMENTS

| | | | |
|---|---|---|---|
| CN | 106847162 | A | 6/2017 |
| KR | 10-2021-0081302 | A | 7/2021 |
| KR | 10-2022-0095921 | A | 7/2022 |
| KR | 10-2023-0099110 | A | 7/2023 |

* cited by examiner

*Primary Examiner* — Muhammad N Edun
(74) *Attorney, Agent, or Firm* — F. CHAU & ASSOCIATES, LLC

(57) ABSTRACT

A scan driving circuit includes: a switching circuit configured to deliver a third voltage to a first node in response to a carry signal and a first clock signal and to deliver the third voltage to a second node in response to the first clock signal; a first output transistor connected between a first voltage terminal and an output terminal, and configured to operate in response to a second signal of the second node, wherein the first voltage terminal receives a first voltage; and a second output transistor connected between the output terminal and a second clock terminal, and configured to operate in response to a first signal of the first node.

20 Claims, 19 Drawing Sheets

SCAN DRIVING CIRCUIT AND DISPLAY DEVICE

CROSS-REFERENCE TO RELATED APPLICATION

This application claims priority under 35 U.S.C. § 119 to Korean Patent Application No. 10-2024-0056541 filed on Apr. 29, 2024, in the Korean Intellectual Property Office, the disclosure of which is incorporated by reference herein in its entirety.

TECHNICAL FIELD

Embodiments of the present invention relate to an electronic device, and more particularly, to an electronic device including a scan driving circuit.

DISCUSSION OF THE RELATED ART

Generally, an electronic device includes pixels that are connected to data lines and scan lines. Each of the pixels includes a light emitting element and a pixel circuit for controlling the light emitting element. The pixel circuit may provide a current, which corresponds to a data signal, to the light emitting element. In addition, light having predetermined luminance may be generated in response to a current flowing through the light emitting element.

A scan driving circuit outputs scan signals to sequentially drive the scan lines.

SUMMARY

According to an embodiment of the present invention, a scan driving circuit includes: a switching circuit configured to deliver a third voltage to a first node in response to a carry signal and a first clock signal and to deliver the third voltage to a second node in response to the first clock signal; a first output transistor connected between a first voltage terminal and an output terminal, and configured to operate in response to a second signal of the second node, wherein the first voltage terminal receives a first voltage; and a second output transistor connected between the output terminal and a second clock terminal, and configured to operate in response to a first signal of the first node.

In an embodiment of the present invention, the third voltage is a direct current (DC) voltage for turning on each of the first output transistor and the second output transistor.

In an embodiment of the present invention, the switching circuit delivers one of a second voltage or the third voltage to the first node in response to the carry signal and the first clock signal, and delivers one of the second voltage or the third voltage to the second node in response to the first clock signal.

In an embodiment of the present invention, the second voltage is lower than or equal to the first voltage, and the third voltage is lower than the second voltage.

In an embodiment of the present invention, the switching circuit includes: a first transistor connected between a third voltage terminal, which receives the third voltage, and the first node, and including a gate electrode that is connected to a carry terminal that receives the carry signal; a second transistor connected between a third node and the first node and including a gate electrode that is connected to the carry terminal; a third transistor connected between a second voltage terminal, which receives the second voltage, and the third node, and including a gate electrode that is connected to a first clock terminal that receives the first clock signal; a fourth transistor connected between the third voltage terminal and the second node and including a gate electrode that is connected to the first clock terminal; and a fifth transistor connected between the second voltage terminal and the second node and including a gate electrode that is connected to the first clock terminal.

In an embodiment of the present invention, the first transistor and the second transistor are transistors having different types from each other.

In an embodiment of the present invention, the fourth transistor and the fifth transistor are transistors having different types from each other.

In an embodiment of the present invention, the scan driving circuit further includes: a capacitor connected between the first node and the output terminal.

In an embodiment of the present invention, the first clock signal and a second clock signal have frequencies a same as each other and different phases from each other.

According to an embodiment of the present invention, a scan driving circuit includes: a first switching circuit configured to deliver one of a second voltage or a third voltage to a first node in response to a carry signal and a first clock signal; a second switching circuit configured to deliver one of the second voltage or the third voltage to a second node in response to the first clock signal; a first output transistor connected between a first voltage terminal and an output terminal, and configured to operate in response to a second signal of the second node, wherein the first voltage terminal receives a first voltage; and a second output transistor connected between the output terminal and a second clock terminal and configured to operate in response to a first signal of the first node.

In an embodiment of the present invention, the third voltage is a direct current (DC) voltage for turning on each of the first output transistor and the second output transistor.

In an embodiment of the present invention, the second voltage is lower than or equal to the first voltage, and the third voltage is lower than the second voltage.

In an embodiment of the present invention, the first switching circuit includes: a first transistor connected between a third voltage terminal, which receives the third voltage, and the first node, and including a gate electrode that is connected to a carry terminal that receives the carry signal; a second transistor connected between a third node and the first node and including a gate electrode that is connected to the carry terminal; and a third transistor connected between a second voltage terminal, which receives the second voltage, and the third node, and including a gate electrode that is connected to a first clock terminal that receives the first clock signal.

In an embodiment of the present invention, the second switching circuit includes: a fourth transistor connected between the third voltage terminal and the second node and including a gate electrode that is connected to the first clock terminal; and a fifth transistor connected between the second voltage terminal and the second node and including a gate electrode that is connected to the first clock terminal.

According to an embodiment of the present invention, an electronic device includes: a display panel including a pixel; a scan driving circuit configured to provide a scan signal to the pixel; a driving controller configured to provide a start signal, a first clock signal, and a second clock signal to the scan driving circuit; and a voltage generator configured to provide a first voltage, a second voltage, and a third voltage to the scan driving circuit, wherein the scan driving circuit includes: a switching circuit configured to deliver the third voltage to a first node in response to the start signal and the first clock signal, and to deliver the third voltage to a second node in response to the first clock signal; a first output transistor connected between a first voltage terminal, which receives the first voltage, and an output terminal that outputs the scan signal, and configured to operate in response to a second signal of the second node; and a second output transistor connected between the output terminal and a second clock terminal that receives the second clock signal, and configured to operate in response to a first signal of the first node.

In an embodiment of the present invention, the third voltage is a direct current (DC) voltage for turning on each of the first output transistor and the second output transistor.

In an embodiment of the present invention, the switching circuit delivers one of the second voltage or the third voltage to the first node in response to the start signal and the first clock signal, and delivers one of the second voltage or the third voltage to the second node in response to the first clock signal.

In an embodiment of the present invention, the second voltage is lower than or equal to the first voltage, and the third voltage is lower than the second voltage.

In an embodiment of the present invention, the switching circuit includes: a first transistor connected between a third voltage terminal, which receives the third voltage, and the first node, and including a gate electrode that is connected to a carry terminal that receives the start signal; a second transistor connected between a third node and the first node, and including a gate electrode that is connected to the carry terminal; a third transistor connected between a second voltage terminal, which receives the second voltage, and the third node, and including a gate electrode that is connected to a first clock terminal that receives the first clock signal; a fourth transistor connected between the third voltage terminal and the second node, and including a gate electrode that is connected to the first clock terminal; and a fifth transistor connected between the second voltage terminal and the second node, and including a gate electrode that is connected to the first clock terminal.

In an embodiment of the present invention, the first transistor and the second transistor are transistors having different types from each other, and wherein the fourth transistor and the fifth transistor are transistors having different types from each other.

BRIEF DESCRIPTION OF THE FIGURES

The above and other features of the present invention will become apparent by describing in detail embodiments thereof with reference to the accompanying drawings.

DETAILED DESCRIPTION OF THE EMBODIMENTS

Figure 1:
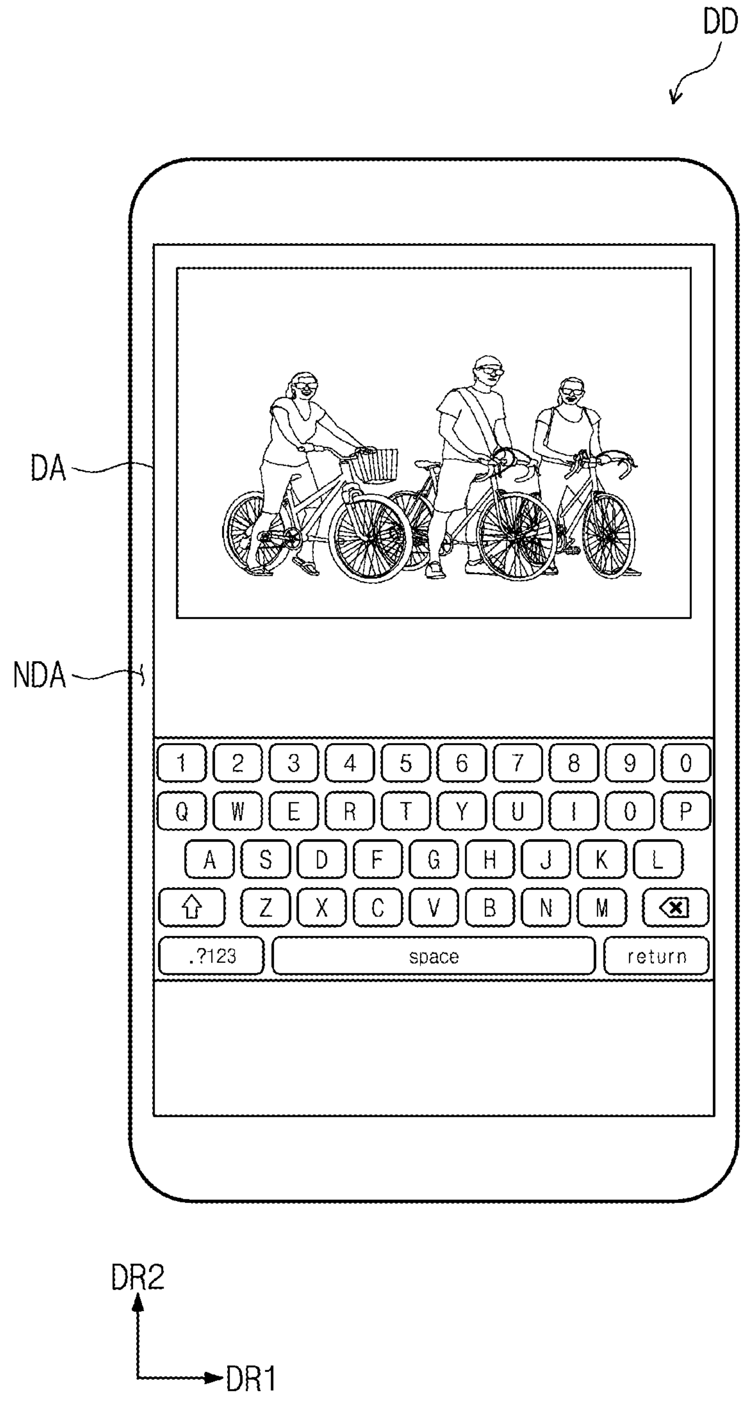
FIG. 1 illustrates an electronic device, according to an embodiment of the present invention.

In the specification, the expression that a first component (or region, layer, part, etc.) is "on", "connected with", or "coupled with" a second component means that the first component is directly on, connected with, or coupled with the second component or that a third component is interposed therebetween.

The same sign (e.g., reference letters and reference numbers) refers to the same element throughout the specification and drawings. In addition, various thicknesses, lengths, and angles are shown and while the arrangement shown does indeed represent an embodiment of the present inventive concept, it is to be understood that modifications of the various thicknesses, lengths, and angles may be possible within the spirit and scope of the present disclosure and the present disclosure is not necessarily limited to the particular thicknesses, lengths, and angles shown. The term "and/or" includes one or more combinations of the associated listed items.

Although the terms "first", "second", etc. may be used to describe various components, the components should not be construed as being limited by the terms. The terms are only used to distinguish one component from another component. For example, without departing from the scope and spirit of the present invention, a first component may be referred to as a second component, and similarly, the second component may be referred to as the first component. As used herein, the terms of a singular form may include a plural form unless the context clearly indicates otherwise.

Also, terms such as "below," "lower," "above," and "upper" may be used to describe the relationships of the components illustrated in the drawings. These terms are used as a spatially relative concept and are described based on the directions indicated in the drawings. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present invention will be described with reference to accompanying drawings.

FIG. 1 shows an electronic device DD, according to an embodiment of the present invention.

Referring to FIG. 1, a portable terminal is illustrated as an example of an electronic device DD according to an embodiment of the present invention. The portable terminal may include, for example, a tablet PC, a smartphone, a personal digital assistant (PDA), a portable multimedia player (PMP), a game console, a wristwatch-type electronic device, and the like. However, the present invention is not limited thereto. The present invention may be used for small and medium electronic devices such as a personal computer, a notebook computer, a kiosk, a car navigation unit, and a camera, in addition to large-sized electronic equipment such as a television or an outside billboard. The above examples are provided as an embodiment, and it is obvious that the electronic device DD may be applied to any other electronic device(s) without departing from the concept of the present invention.

As shown in FIG. 1, a display surface, on which an image is displayed, is parallel to a plane defined by a first direction DR1 and a second direction DR2. For example, the electronic device DD may include a plurality of areas that are separated from each other on the display surface. The display surface includes a display area DA, in which the image is displayed, and a non-display area NDA adjacent to the display area DA. The non-display area NDA may be referred to as a bezel area. For example, the display area DA may have a rectangular shape. The non-display area NDA at least partially surrounds the display area DA. In addition, for example, the electronic device DD may include a shape thus partially curved.

Figure 2:
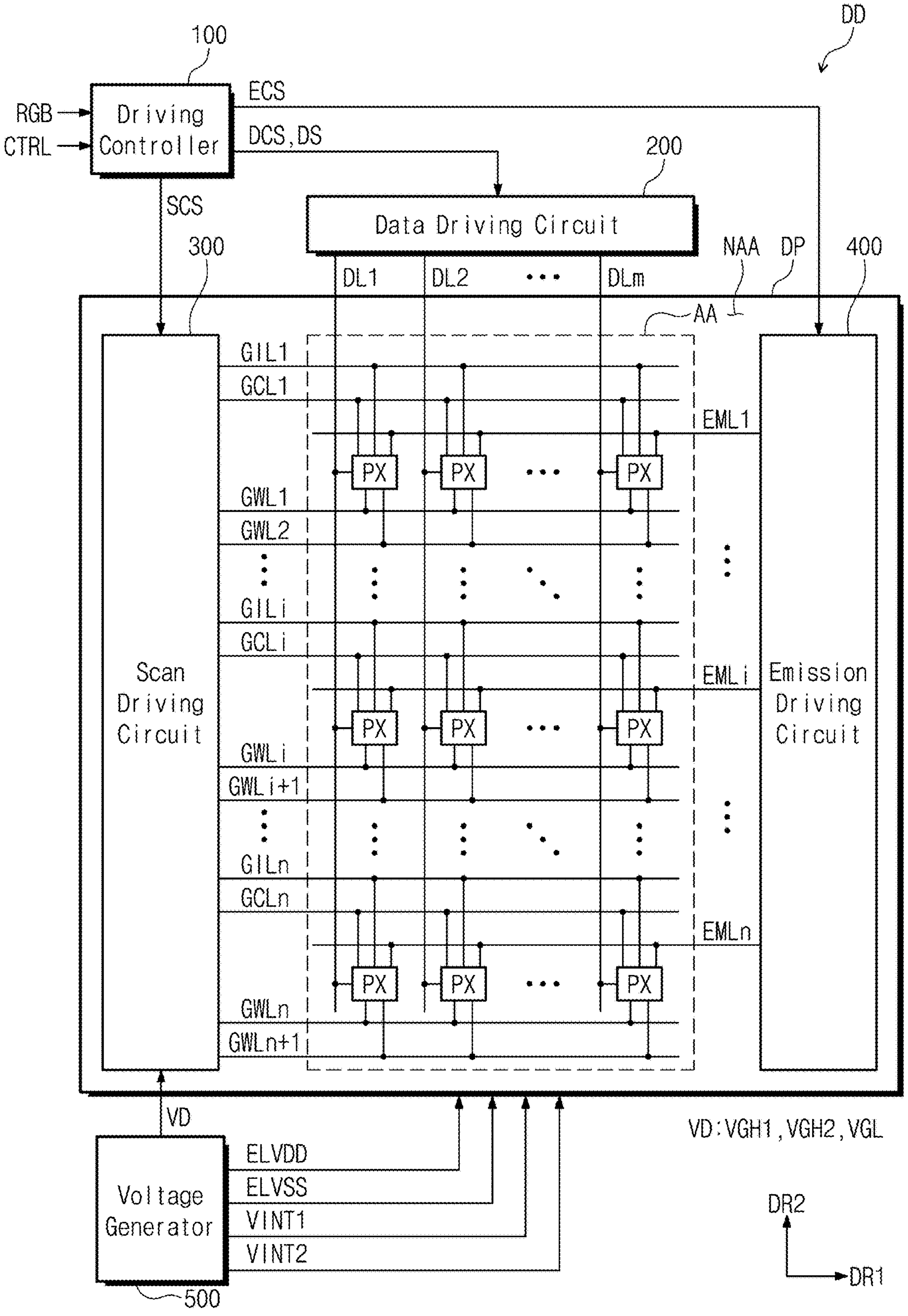
FIG. 2 is a block diagram of an electronic device, according to an embodiment of the present invention.

FIG. 2 is a block diagram of the electronic device DD, according to an embodiment of the present invention.

Referring to FIG. 2, the electronic device DD includes a display panel DP, a driving controller 100, a data driving circuit 200, a scan driving circuit 300, an emission driving circuit 400, and a voltage generator 500.

The driving controller 100 receives an image signal RGB and a control signal CTRL. The driving controller 100 converts the image signal RGB into an image data signal DS and outputs the image data signal DS. The driving controller 100 outputs a scan control signal SCS, a data control signal DCS, and an emission control signal ECS.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later.

The scan driving circuit 300 receives the scan control signal SCS from the driving controller 100. The scan driving circuit 300 may output scan signals to the scan lines GIL1 to GILn, GCL1 to GCLn, and GWL1 to GWLn+1 in response to receiving the scan control signal SCS.

The emission driving circuit 400 receives the emission control signal ECS from the driving controller 100. The emission driving circuit 400 may output emission signals to the emission lines EML1 to EMLn in response to receiving the emission control signal ECS.

The voltage generator 500 generates voltages to operate the display panel DP. In an embodiment of the present invention, the voltage generator 500 may generate a first driving voltage ELVDD, a second driving voltage ELVSS, a first initialization voltage VINT1, and a second initialization voltage VINT2, which are for an operation of the display panel DP. In an embodiment of the present invention, the voltage generator 500 may generate a driving voltage VD for the operation of the scan driving circuit 300. In an embodiment of the present invention, the driving voltage VD may include a first voltage VGH1, a second voltage VGH2, and a third voltage VGL.

The display panel DP includes scan lines GIL1 to GILn, GCL1 to GCLn, and GWL1 to GWLn+1, emission lines EML1 to EMLn, the data lines DL1 to DLm, and pixels PX.

The display panel DP includes an active area AA and an inactive area NAA. The active area AA may correspond to the display area DA of the electronic device DD shown in FIG. 1, and the inactive area NAA may correspond to the non-display area NDA.

In an embodiment of the present invention, the pixels PX may be placed in the active area AA of the display panel DP. The scan driving circuit 300 and the emission driving circuit 400 may be placed in the inactive area NAA of the display panel DP. In an embodiment of the present invention, the scan driving circuit 300 is arranged adjacent to the first side of the active area AA. The scan lines GIL1 to GILn, GCL1 to GCLn, and GWL1 to GWLn+1 extend from the scan driving circuit 300 in the first direction DR1. The emission driving circuit 400 is arranged adjacent to the second side of the active area AA. The emission lines EML1 to EMLn extend from the emission driving circuit 400 in a direction opposite to the first direction DR1.

The scan lines GIL1 to GILn, GCL1 to GCLn, and GWL1 to GWLn+1 and the emission lines EML1 to EMLn are arranged spaced apart from one another in the second direction DR2. The data lines DL1 to DLm extend from the data driving circuit 200 in a direction opposite to the second direction DR2, and are arranged spaced apart from one another in the first direction DR1.

In the example shown in FIG. 2, the scan driving circuit 300 and the emission driving circuit 400 are arranged to face each other with the pixels PX interposed therebetween, but the present disclosure is not limited thereto. For example, the scan driving circuit 300 and the emission driving circuit 400 may be placed adjacent to each other in the inactive area NAA of the display panel DP. In an embodiment of the present invention, the scan driving circuit 300 and the emission driving circuit 400 may be implemented with one circuit.

The plurality of pixels PX are electrically connected to the scan lines GIL1 to GILn, GCL1 to GCLn, and GWL1 to GWLn+1, the emission lines EML1 to EMLn, and the data lines DL1 to DLm. For example, each of the plurality of pixels PX may be electrically connected to four scan lines and one emission line. For example, as shown in FIG. 2, a first row of pixels PX may be connected to the scan lines GIL1, GCL1, GWL1, and GWL2 and the emission line EML1. Furthermore, the i-th row of pixels PX may be connected to the scan lines GILi, GCLi, GWLi, and GWLi+1 and the emission line EMLi. The n-th row of pixels PX may be connected to the scan lines GILn, GCLn, GWLn, and GWLn+1 and the emission line EMLn.

Each of the plurality of pixels PX includes a light emitting element ED (see FIG. 3) and a pixel circuit PXC (see FIG. 3) for controlling the emission of the light emitting element ED. The pixel circuit PXC may include one or more transistors and one or more capacitors. The scan driving circuit 300 and the emission driving circuit 400 may include transistors formed through the same process as the pixel circuit PXC.

The scan driving circuit 300 according to an embodiment of the present invention is placed in the inactive area NAA of the display panel DP. The scan driving circuit 300 according to an embodiment of the present invention may minimize the circuit area by including the minimum number of transistors. Accordingly, it is possible to minimize the area of the non-display area NDA of the electronic device DD (see FIG. 1) corresponding to the inactive area NAA of the display panel DP.

Figure 3:
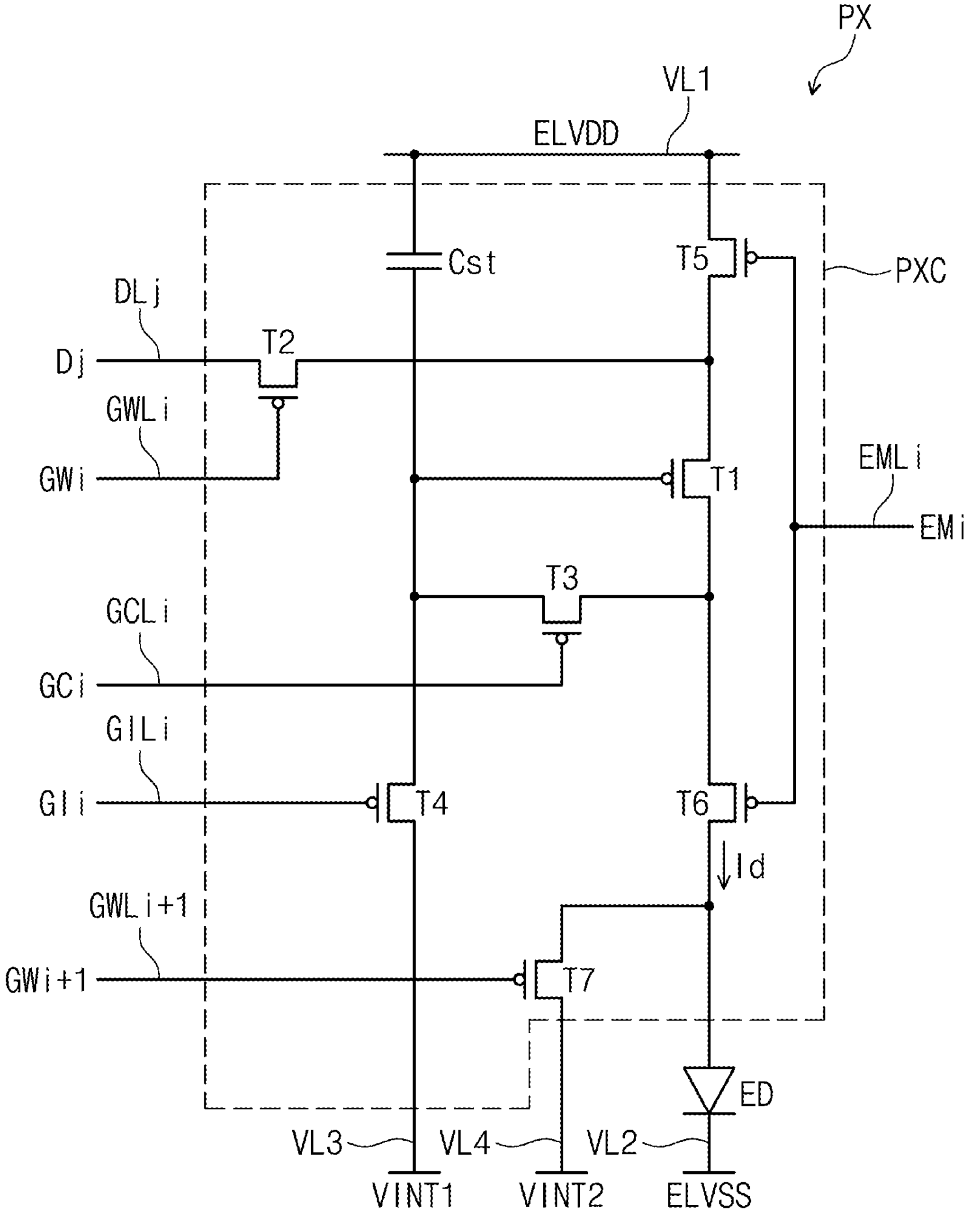
FIG. 3 is a circuit diagram of a pixel, according to an embodiment of the present invention.

FIG. 3 is a circuit diagram of a pixel PX, according to an embodiment of the present invention.

FIG. 3 illustrates a circuit diagram of a pixel PX connected to the j-th data line DLj among the data lines DL1 to DLm, the i-th scan lines GILi, GCLi, and GWLi and the (i+1)-th scan line GWLi+1 among the scan lines GIL1 to GILn, GCL1 to GCLn, and GWL1 to GWLn+1, and the i-th emission line EMLi among the emission lines EML1 to EMLn, which are illustrated in FIG. 2.

Each of the plurality of pixels PX shown in FIG. 2 may have the same circuit configuration as the pixel PX shown in FIG. 3.

Referring to FIG. 3, the pixel PX of an electronic device according to an embodiment of the present invention includes the pixel circuit PXC and the at least one light emitting element ED. In an embodiment of the present invention, the light emitting element ED may be a light emitting diode. In an embodiment of the present invention, it is described that the one pixel PX includes the one light emitting element ED. The pixel circuit PXC includes first to seventh transistors T1, T2, T3, T4, T5, T6, and T7 and a capacitor Cst.

In an embodiment of the present invention, each of the first to seventh transistors T1 to T7 is a P-type transistor having a low-temperature polycrystalline silicon (LTPS) semiconductor layer. However, the present invention is not limited thereto. For example, each of the first to seventh transistors T1 to T7 may be an N-type transistor using an oxide semiconductor as a semiconductor layer.

In an embodiment of the present invention, at least one of the first to seventh transistors T1 to T7 may be an N-type transistor, and the other(s) thereof may be P-type transistors. Moreover, a circuit configuration of the pixel PX according to an embodiment of the present invention is not limited to an embodiment in FIG. 3, and may be implemented in a modified manner.

The scan lines GILi, GCLi, GWLi, and GWLi+1 may deliver scan signals GIi, GCi, GWi, and GWi+1, respectively. The emission line EMLi may deliver an emission signal EMi. The data line DLj delivers a data signal Dj. The data signal Dj may have a voltage level corresponding to the image signal RGB that is input to the electronic device DD (see FIG. 1). First to fourth driving voltage lines VL1, VL2, VL3, and VL4 may transfer the first driving voltage ELVDD, the second driving voltage ELVSS, the first initialization voltage VINT1, and the second initialization voltage VINT2, respectively.

The first transistor T1 includes a first electrode, which is connected to the first driving voltage line VL1 via the fifth transistor T5, a second electrode, which is electrically connected to an anode of the light emitting element ED via the sixth transistor T6, and a gate electrode, which is connected to one end of the capacitor Cst. The first transistor T1 may receive the data signal Dj delivered through the data line DLj depending on the switching operation of the second transistor T2 and then may supply a driving current Id to the light emitting element ED.

The second transistor T2 includes a first electrode, which is connected to the data line DLj, a second electrode, which is connected to the first electrode of the first transistor T1, and a gate electrode, which is connected to the scan line GWLi. The second transistor T2 may be turned on in response to the scan signal GWi transferred through the scan line GWLi and may transfer the data signal Dj transferred through the data line DLj to the first electrode of the first transistor T1.

The third transistor T3 includes a first electrode, which is connected with the gate electrode of the first transistor T1, a second electrode, which is connected with the second electrode of the first transistor T1, and a gate electrode, which is connected with the scan line GCLi. The third transistor T3 may be turned on in response to the scan signal GCi transferred through the scan line GCLi, and thus, the gate electrode and the second electrode of the first transistor T1 may be connected to each other, that is, the first transistor T1 may be diode-connected.

The fourth transistor T4 includes a first electrode, which is connected with the gate electrode of the first transistor T1, a second electrode, which is connected with the third driving voltage line VL3 through which the first initialization voltage VINT1 is transferred, and a gate electrode, which is connected with the scan line GILi. The fourth transistor T4 may be turned on in response to the scan signal GIi that is transferred through the scan line GILi such that the first initialization voltage VINT1 is transferred to the gate electrode of the first transistor T1. Accordingly, an initialization operation of initializing a voltage of the gate electrode of the first transistor T1 may be performed.

The fifth transistor T5 includes a first electrode, which is connected to the first driving voltage line VL1, a second electrode, which is connected to the first electrode of the first transistor T1, and a gate electrode, which is connected to the emission line EMLi.

The sixth transistor T6 includes a first electrode, which is connected to the second electrode of the first transistor T1, a second electrode, which is connected with the anode of the light emitting element ED, and a gate electrode, which is connected to the emission line EMLi.

The fifth transistor T5 and the sixth transistor T6 may be simultaneously turned on in response to the emission signal EMi that is transferred through the emission line EMLi. In this way, the first driving voltage ELVDD may be compensated for through the diode-connected transistor T1 so as to be supplied to the light emitting element ED.

The seventh transistor T7 includes a first electrode, which is connected to the second electrode of the sixth transistor T6, a second electrode, which is connected to the fourth driving voltage line VL4, and a gate electrode, which is connected to the scan line GWLi+1. The seventh transistor T7 is turned on in response to the scan signal GWi+1 that is transferred through the scan line GWLi+1 and bypasses a current of the anode of the light emitting element ED to the fourth voltage line VL4.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2, to which the second driving voltage ELVSS is delivered. The pixel circuit PXC according to an embodiment of the present invention is not limited to that shown in FIG. 3. The number of transistors included in the pixel circuit PXC, the number of capacitors, and the connection relationship thereof may be modified in various manners.

Figure 4:
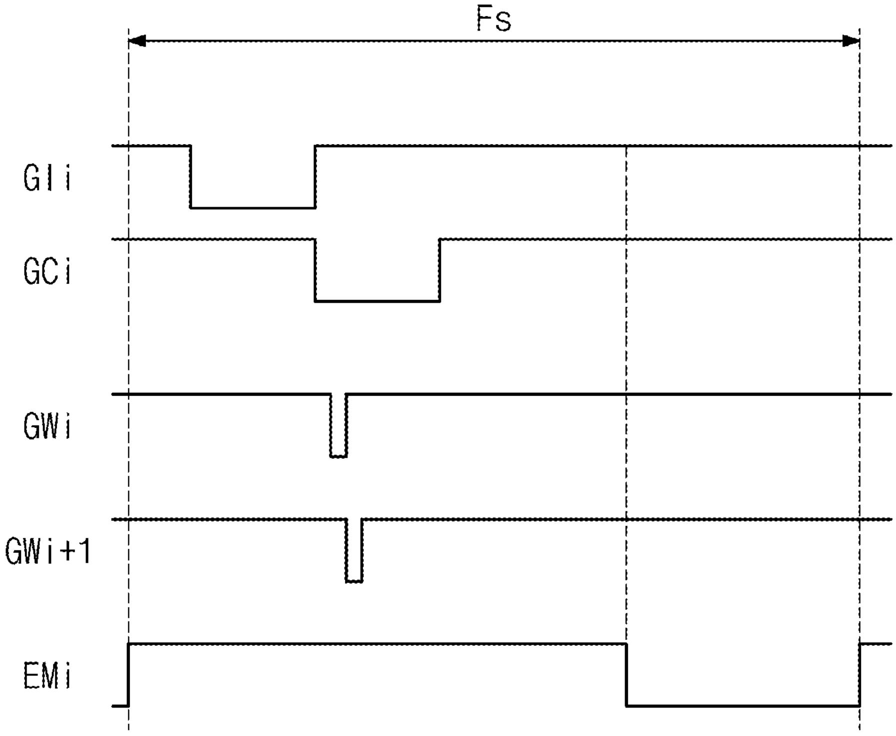
FIG. 4 is a timing diagram for describing an operation of the pixel shown in FIG. 3.

FIG. 4 is a timing diagram for describing an operation of the pixel shown in FIG. 3.

Referring to FIGS. 3 and 4, one frame Fs may include an initialization period, a data programming and compensation period, and an emission period.

When the scan signal GIi having a low level is provided through the scan line GILi during the initialization period, the fourth transistor T4 is turned on. The first initialization voltage VINT1 is delivered to the gate electrode of the first transistor T1 through the fourth transistor T4 so as to initialize the first transistor T1.

Next, when the scan signal GCi having a low level is supplied through the scan line GCLi during the data programming and compensation period, the third transistor T3 is turned on. The first transistor T1 is diode-connected by the third transistor T3 thus turned on to be forward-biased. At this time, when the scan signal GWi having a low level is supplied through the scan line GWLi, the second transistor T2 is turned on. In the case, a compensation voltage, which is obtained by reducing the voltage of the data signal Dj that is supplied from the data line DLj by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite ends (e.g., opposite electrodes) of the capacitor Cst, charges corresponding to a difference between the first driving voltage ELVDD and the compensation voltage may be stored in the capacitor Cst.

In the meantime, when the scan signal GWi+1 having a low level is provided to the gate electrode of the seventh transistor T7 through the scan line GWLi+1, the seventh transistor T7 is turned on. As the seventh transistor T7 is turned on, the anode of the light emitting element ED is electrically connected to the fourth driving voltage line VL4. Accordingly, the anode of the light emitting element ED may be initialized to the second initialization voltage VINT2.

Next, during the emission period, the emission signal EMi supplied from the emission line EMLi is changed from a high level to a low level. During the emission period, the fifth transistor T5 and the sixth transistor T6 are turned on by the emission signal EMi having a low level. In this case, the driving current Id that is according to a voltage difference between the gate voltage of the gate electrode of the first transistor T1 and the first driving voltage ELVDD is generated and supplied to the light emitting element ED through the sixth transistor T6, and the driving current Id flows through the light emitting element ED. The light emitting element ED may emit light with a luminance corresponding to the driving current Id.

Figure 5:
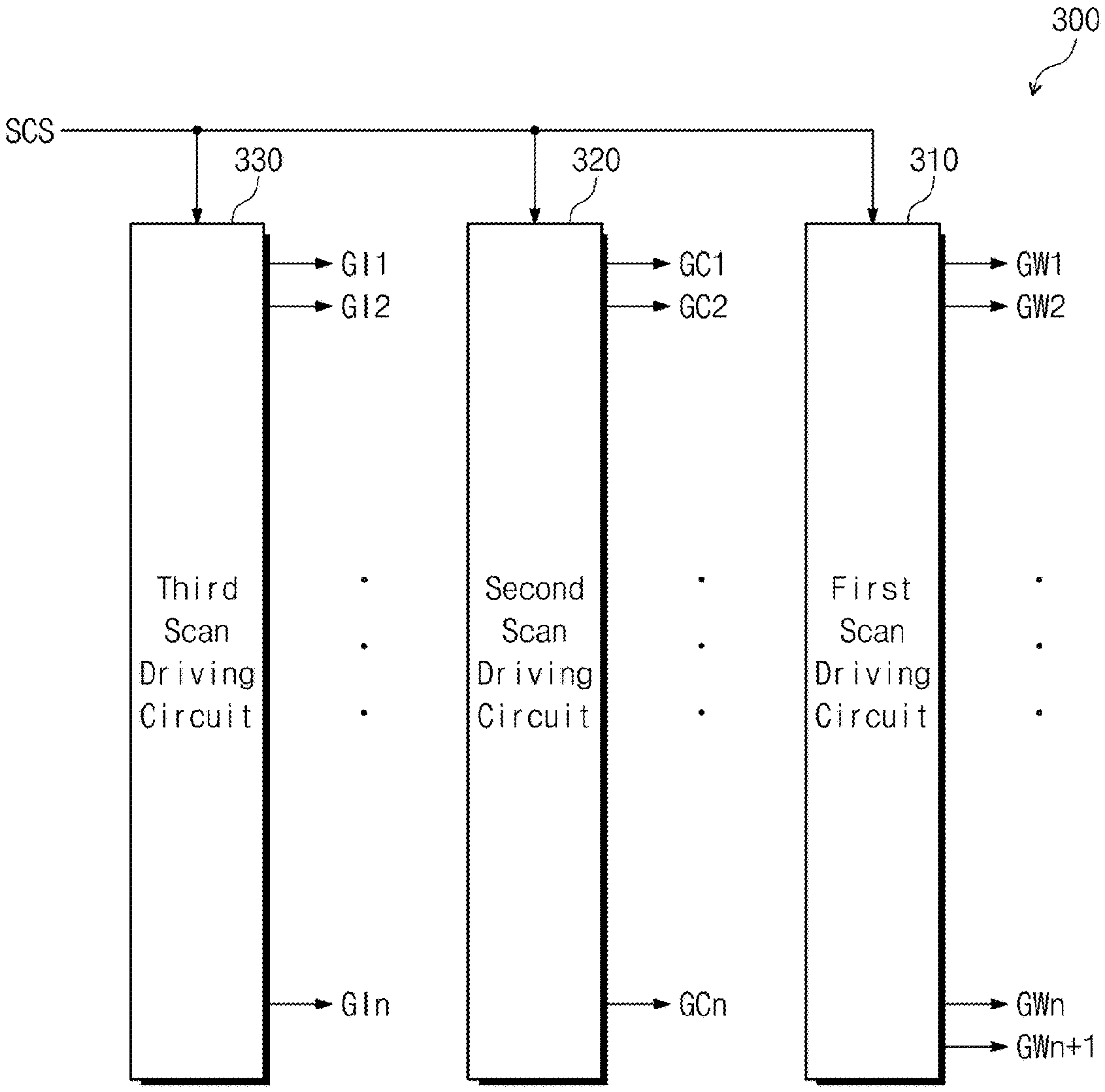
FIG. 5 is a block diagram of a scan driving circuit, according to an embodiment of the present invention.

FIG. 5 is a block diagram of the scan driving circuit 300, according to an embodiment of the present invention.

Referring to FIG. 5, the scan driving circuit 300 includes a first scan driving circuit 310, a second scan driving circuit 320, and a third scan driving circuit 330.

The first scan driving circuit 310 outputs scan signals GW1 to GWn+1 in response to the scan control signal SCS. In an embodiment of the present invention, the scan signals GW1 to GWn+1 may sequentially transition to a first level (e.g., a low level).

The second scan driving circuit 320 outputs scan signals GC1 to GCn in response to the scan control signal SCS. The scan signals GC1 to GCn may sequentially transition to the first level (e.g., a low level).

The third scan driving circuit 330 outputs the scan signals GI1 to GIn in response to the scan control signal SCS. The scan signals GI1 to GIn may sequentially transition to the first level (e.g., a low level).

Figure 6:
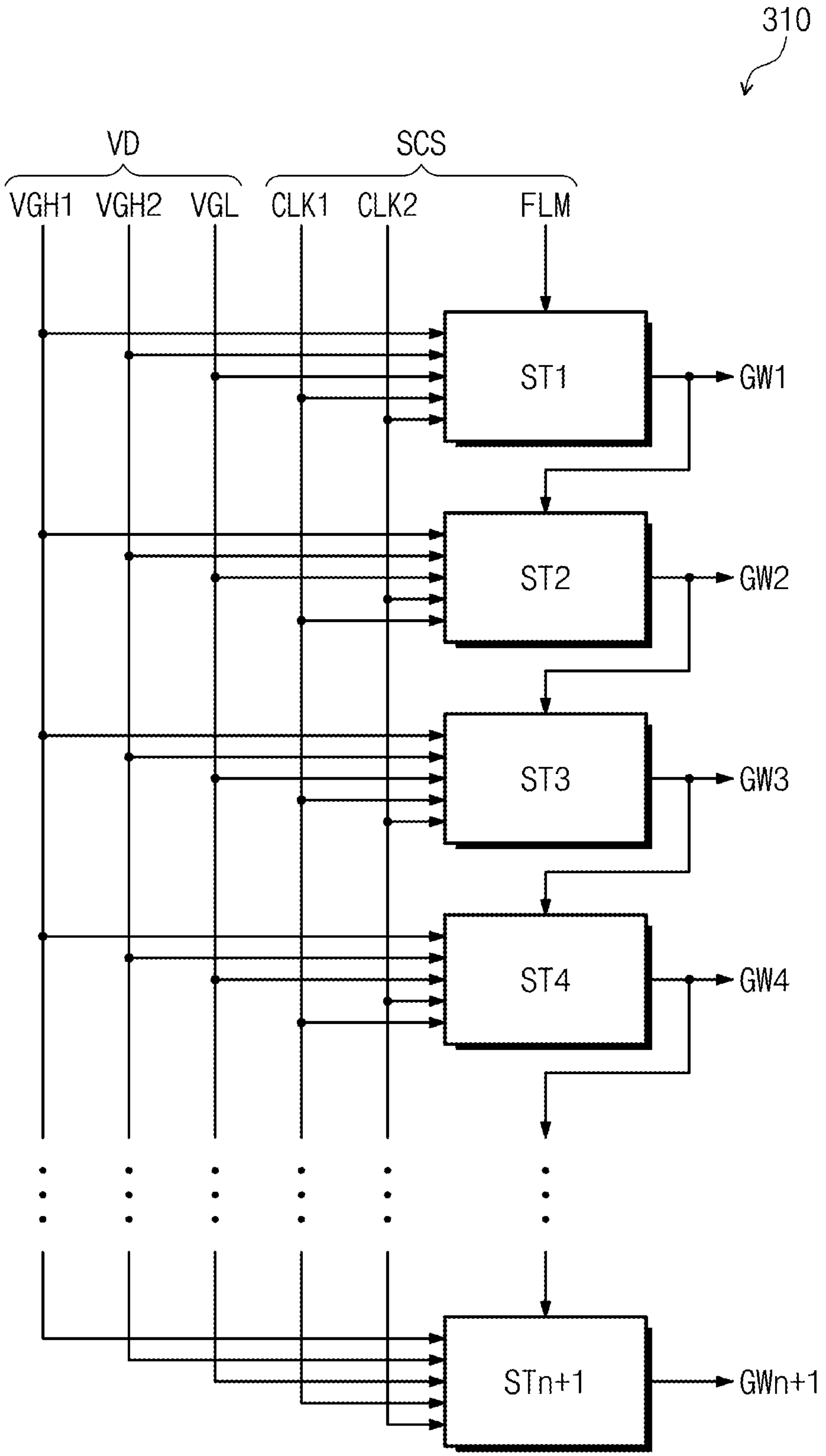
FIG. 6 is a block diagram of a first scan driving circuit, according to an embodiment of the present invention.

FIG. 6 is a block diagram of the first scan driving circuit 310, according to an embodiment of the present invention.

Referring to FIG. 6, the first scan driving circuit 310 includes driving stages ST1 to STn+1.

Each of the driving stages ST1 to STn+1 receives the scan control signal SCS from the driving controller 100 shown in FIG. 2. The scan control signal SCS includes a start signal FLM, a first clock signal CLK1, and a second clock signal CLK2. Each of the driving stages ST1 to STn+1 receives the driving voltage VD.

The driving voltage VD includes the first voltage VGH1, the second voltage VGH2 and the third voltage VGL. The first voltage VGH1, the second voltage VGH2 and the third voltage VGL may be provided from the voltage generator 500 illustrated in FIG. 2.

In an embodiment of the present invention, the driving stages ST1 to STn+1 output the scan signals GW1 to GWn+1, respectively. The scan signals GW1 to GWn+1 may be provided to the scan lines GWL1 to GWLn+1 shown in FIG. 2, respectively.

The first driving stage ST1 receives the start signal FLM as a carry signal. Each of the second to (n+1)-th driving stages ST2 to STn+1 has a dependent connection relationship indicating that the scan signal output from the previous driving stage is received as the carry signal. For example, the scan signal GWi output from the i-th driving stage STi among the driving stages may be provided as a carry signal of the (i+k)-th driving stage STi+k (each of 'I' and 'k' is a natural number). For example, the second driving stage ST2 receives the scan signal GW1 that is output from the first driving stage ST1 as a carry signal. The third driving stage ST3 receives the scan signal GW2 that is output from the second driving stage ST2 as a carry signal. FIG. 6 shows that the i-th driving stage STi receives a scan signal from the (i−1)-th driving stage STi−1 as a carry signal, but the present invention is not limited thereto.

Although only the first scan driving circuit 310 is shown in FIG. 6, each of the second scan driving circuit 320 and the third scan driving circuit 330, which are shown in FIG. 5, may also include the same components as the first scan driving circuit 310.

Figure 7:
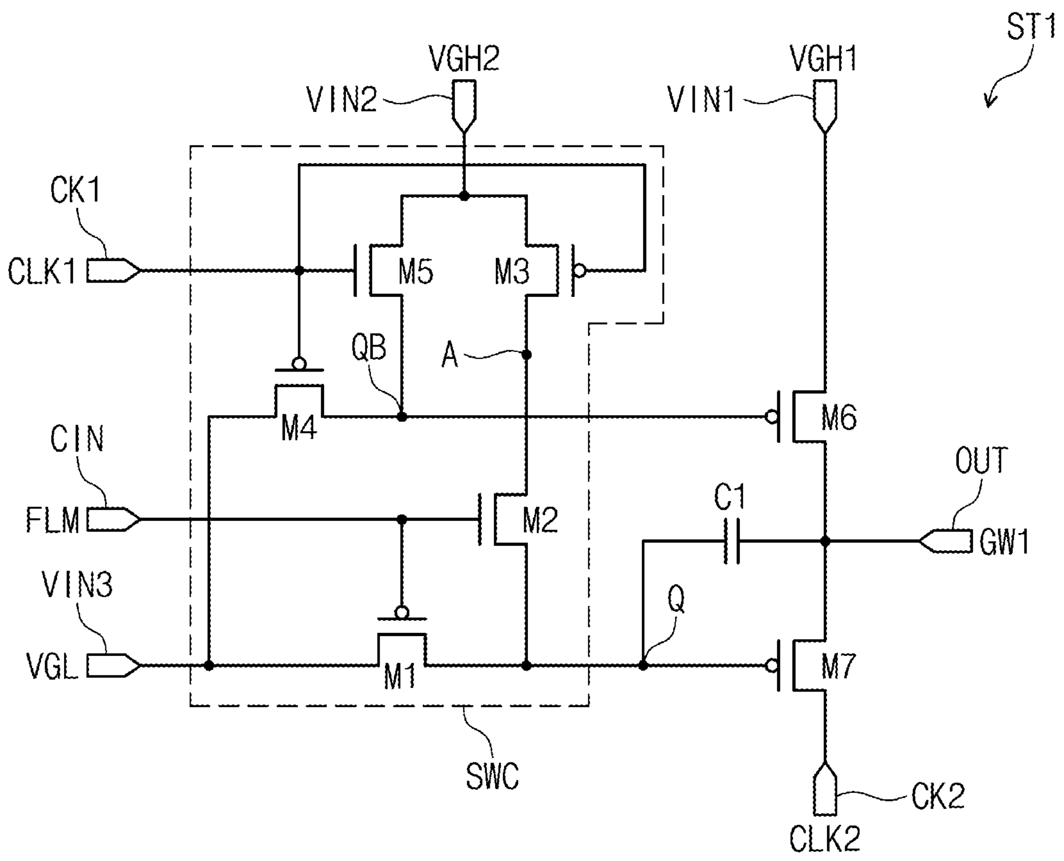
FIG. 7 is a circuit diagram of a driving stage, according to an embodiment of the present invention.

FIG. 7 is a circuit diagram of a driving stage ST1, according to an embodiment of the present invention.

Referring to FIG. 7, the driving stage ST1 includes first to seventh transistors M1 to M7 and a capacitor C1. In addition, the driving stage ST1 further includes first and second clock terminals CK1 and CK2, a carry input terminal CIN, first, second, and third voltage terminals VIN1, VIN2, and VIN3, and an output terminal OUT.

The driving stage ST1 outputs the scan signal GW1 to the output terminal OUT in response to the first and second clock signals CLK1 and CLK2, which are received through the first and second clock terminals CK1 and CK2, respectively, and a carry signal (i.e., the start signal FLM) received through the carry input terminal CIN.

Each of the first, second, and third voltages VGH1, VGH2, and VGL transmitted to at the first, second, and third voltage terminals VIN1, VIN2, and VIN3 may be a direct current (DC) voltage having a predetermined voltage level. In an embodiment of the present invention, each of the first voltage VGH1 and the second voltage VGH2 may have a voltage level higher than the third voltage VGL. In an embodiment of the present invention, the second voltage VGH2 may have a lower voltage level than the first voltage VGH1. However, the present invention is not limited thereto. In an embodiment of the present invention, the second voltage VGH2 may be a voltage level that is lower than or equal to the first voltage VGH1.

In an embodiment of the present invention, the third voltage VGL may be the DC voltage for turning on both the sixth transistor M6 and the seventh transistor M7.

In an embodiment of the present invention, the first and second clock signals CLK1 and CLK2 may have the same frequency as each other and different phases from each other.

A switching circuit SWC is connected to the second voltage terminal VIN2, the third voltage terminal VIN3, the first clock terminal CK1 and the carry input terminal CIN. The switching circuit SWC outputs a second signal to a second node QB in response to the first clock signal CLK1 that is received by the first clock terminal CK1. The switching circuit SWC outputs the first signal to a first node Q in response to the first clock signal CLK1, which is received at the first clock terminal CK1, and the carry signal FLM, which is received at the carry input terminal CIN.

The switching circuit SWC includes the first, second, third, fourth, and fifth transistors M1, M2, M3, M4, and M5.

The first transistor M1 is connected between the third voltage terminal VIN3 and the first node Q, and includes a gate electrode that is connected to the carry input terminal CIN.

The second transistor M2 is connected between a third node A and the first node Q and includes a gate electrode that is connected to the carry input terminal CIN.

The third transistor M3 is connected between the second voltage terminal VIN2 and the third node A, and includes a gate electrode that is connected to the first clock terminal CK1.

The fourth transistor M4 is connected between the third voltage terminal VIN3 and the second node QB, and includes a gate electrode that is connected to the first clock terminal CK1.

The fifth transistor M5 is connected between the second voltage terminal VIN2 and the second node QB, and includes a gate electrode that is connected to the first clock terminal CK1.

The sixth transistor M6 is connected between the first voltage terminal VIN1 and the output terminal OUT, and includes a gate electrode that is connected to the second node QB. The sixth transistor M6 may be referred to as a “first output transistor”.

The seventh transistor M7 is connected between the output terminal OUT and the second clock terminal CK2, and includes a gate electrode that is connected to the first node Q. The seventh transistor M7 may be referred to as a “second output transistor”.

The capacitor C1 is connected between the first node Q and the output terminal OUT.

In an embodiment of the present invention, each of the first, third, fourth, sixth, and seventh transistors M1, M3, M4, M6, and M7 are P-type transistors having LTPS as a semiconductor layer. Each of the second and fifth transistors M2 and M5 may be an N-type transistor having an oxide semiconductor as a semiconductor layer. However, the present invention is not limited thereto.

The first driving stage ST1 may output the scan signal GW1 by including seven transistors (i.e., the first to seventh transistors M1 to M7) and the one capacitor C1. The circuit area of the scan driving circuit 300 (see FIG. 2) may be minimized by minimizing the number of transistors and capacitors, which are included in the first driving stage ST1.

Although only the first driving stage ST1 is shown in FIG. 7, each of the second to (n+1)-th driving stages ST2, ST3, ST4, . . . , STn+1 shown in FIG. 6 may include a circuit configuration that is similar to that of the first driving stage ST1 shown in FIG. 7.

Each of some driving stages (e.g., the odd-numbered driving stages ST1, ST3, . . . , and STn+1) of the driving stages ST1 to STn+1 shown in FIG. 6 may include the same circuit configuration as that of the first driving stage ST1 shown in FIG. 7.

Each of the other driving stages (e.g., the even-numbered driving stages ST2, ST4, . . . , and STn) among the driving stages ST1 to STn+1 shown in FIG. 6 may include some different circuit configurations from the first driving stage ST1 shown in FIG. 7. For example, the first clock terminal CK1 of each of the even-numbered driving stage ST2, ST4, . . . , and STn may receive the second clock signal CLK2, and the second clock terminal CK2 of each of the even-numbered driving stage ST2, ST4, . . . , and STn may receive the first clock signal CLK1.

FIGS. 8A to 8E are circuit diagrams for describing an operation of the first driving stage ST1.

FIGS. 9A to 9E are timing diagrams for describing an operation of the first driving stage ST1.

Figure 8A:
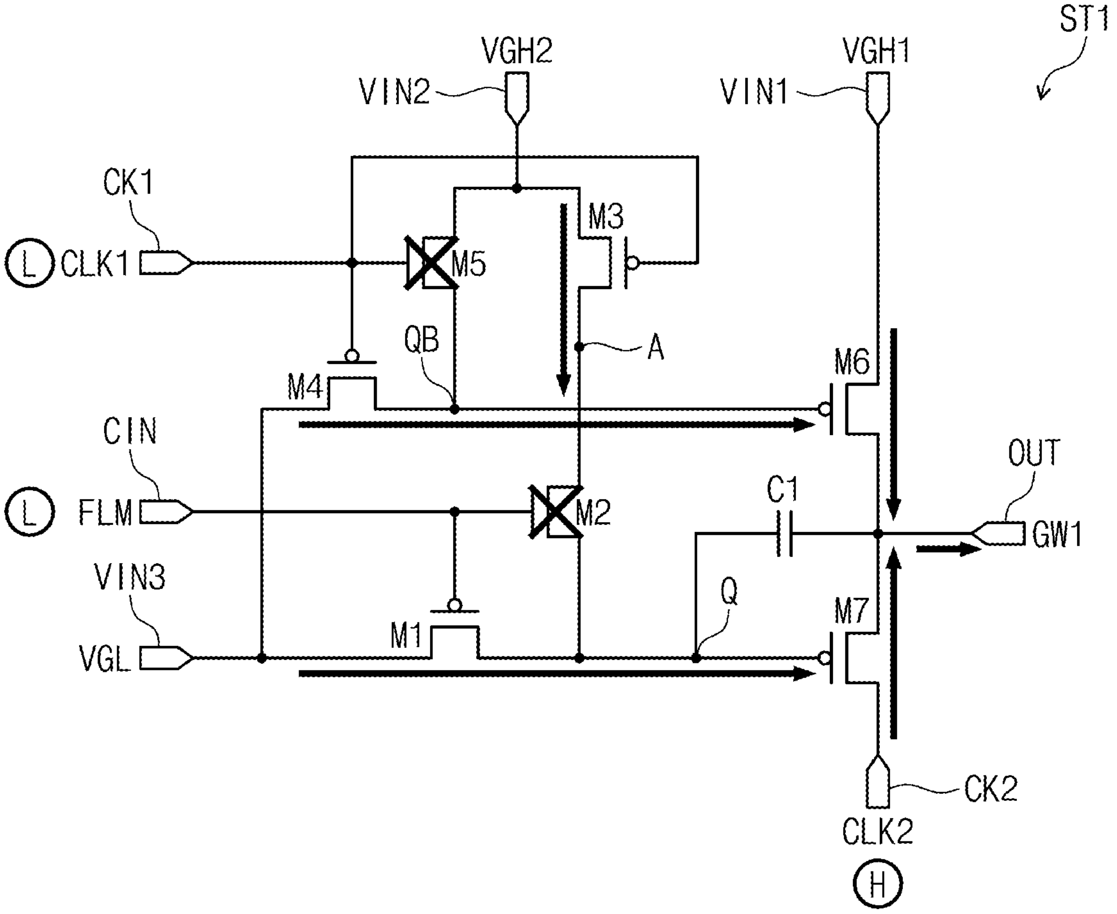
FIGS. 8A to 8E are circuit diagrams for describing an operation of a driving stage.
Figure 9A:
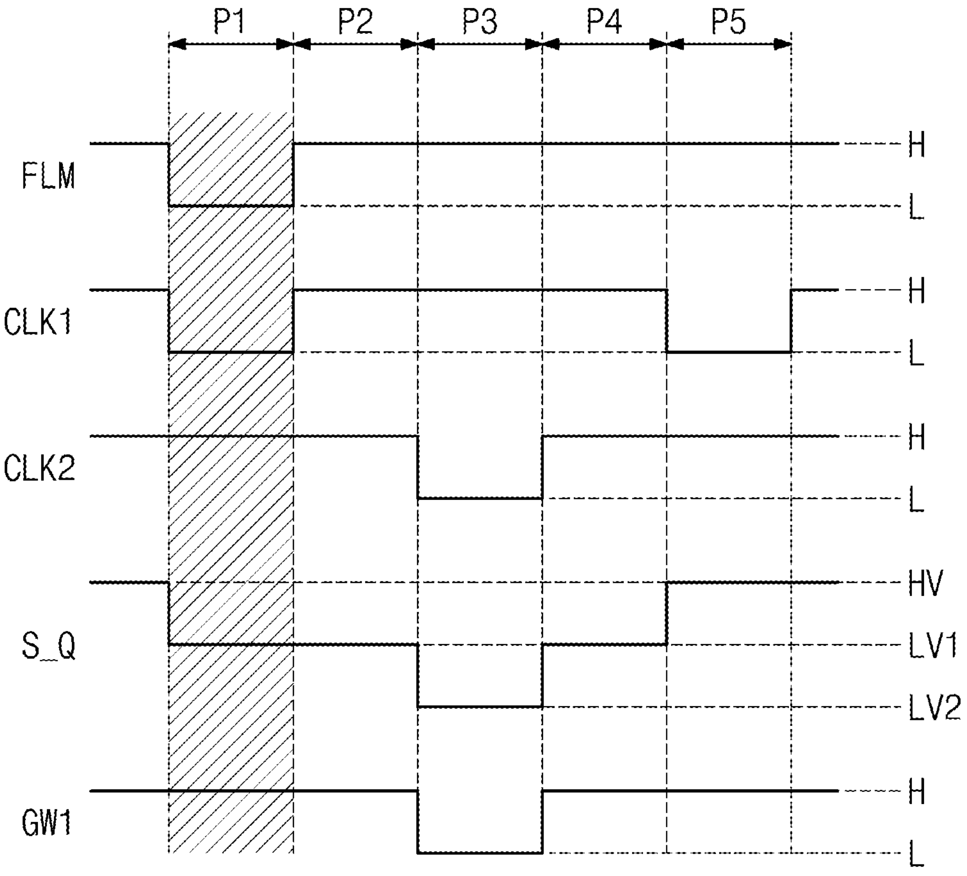
FIGS. 9A, 9B, 9C, 9D, and 9E are timing diagrams for describing an operation of a driving stage.

Referring to FIGS. 8A and 9A, during a first period P1, each of a carry signal (i.e., the start signal FLM) and the first clock signal CLK1 is at a low level L, and the second clock signal CLK2 is at a high level H.

When the start signal FLM is at a low level L, the first transistor M1 is turned on and the second transistor M2 is turned off. As the first transistor M1 turns on, the first node Q is at the low level L that corresponds to the third voltage VGL. The seventh transistor M7 may be turned on in response to a first signal S_Q having a first low level LV1 of the first node Q.

When the first clock signal CLK1 is at the low level L, each of the third transistor M3 and the fourth transistor M4 are turned on, and the fifth transistor M5 is turned off.

Even though the third transistor M3 is turned on to deliver the second voltage VGH2 to the second node QB, the fourth transistor M4 is turned on, and thus, the second node QB may be discharged to the third voltage VGL. The sixth transistor M6 may be turned on in response to a second signal of the second node QB.

The first voltage VGH1 may be output to the output terminal OUT through the sixth transistor M6, which is turned on by the second signal of the second node QB. Furthermore, the second clock signal CLK2 having a high level may be output to the output terminal OUT through the seventh transistor M7, which is turned on which is turned in response to the first signal S_Q. As a result, the scan signal GW1 is a high level H.

During the first period P1, the third voltage VGL, which is a DC voltage, may be delivered to the first node Q. Accordingly, during the first period P1, the first signal S_Q of the first node Q may be stably maintained at a first low level LV1. As the first signal S_Q of the first node Q is maintained at a constant voltage level, the turn-on state of the seventh transistor M7 may be maintained stably.

Moreover, during the first period P1, the second signal of the second node QB may be stably maintained at the first low level LV1. As the second signal of the second node QB is maintained at a constant voltage level, the turn-on state of the sixth transistor M6 may be stably maintained. As a result, the scan signal GW1 may be stably maintained at the high level H.

Figure 8B:
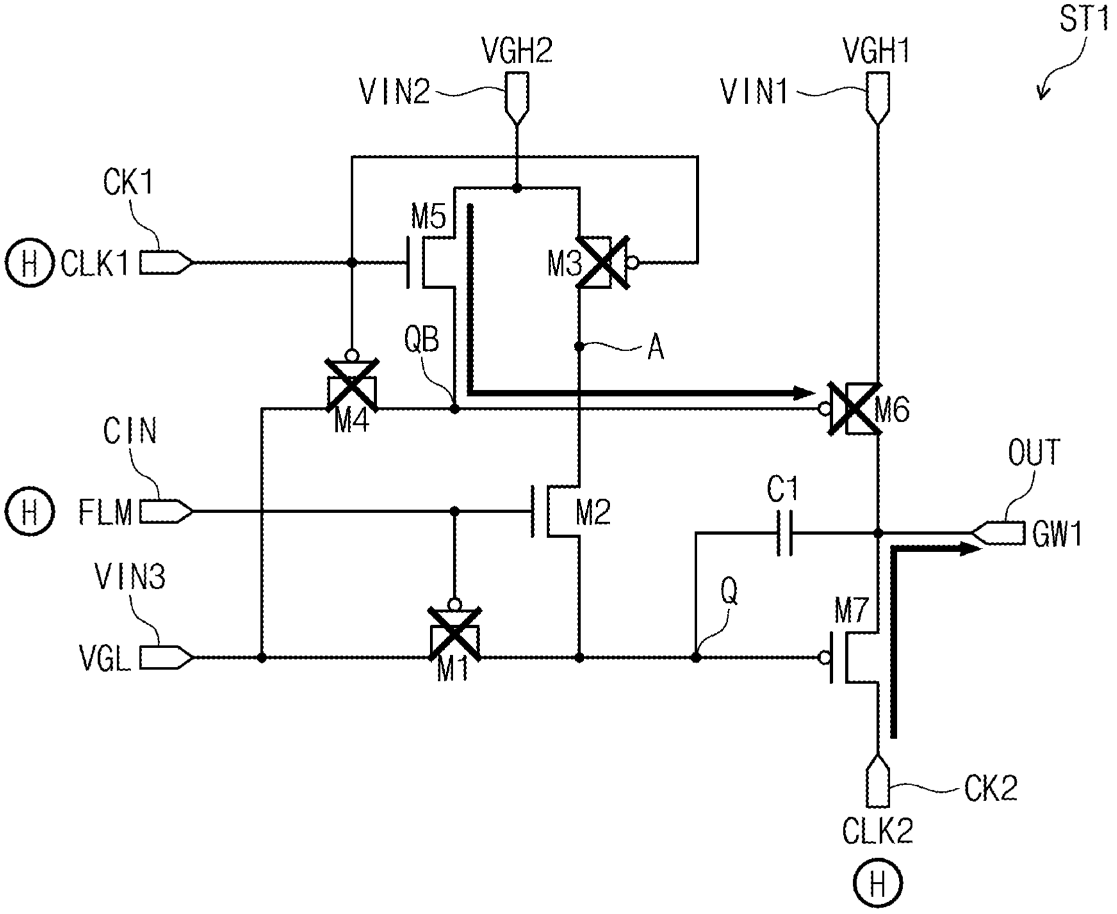
Figure 9B:
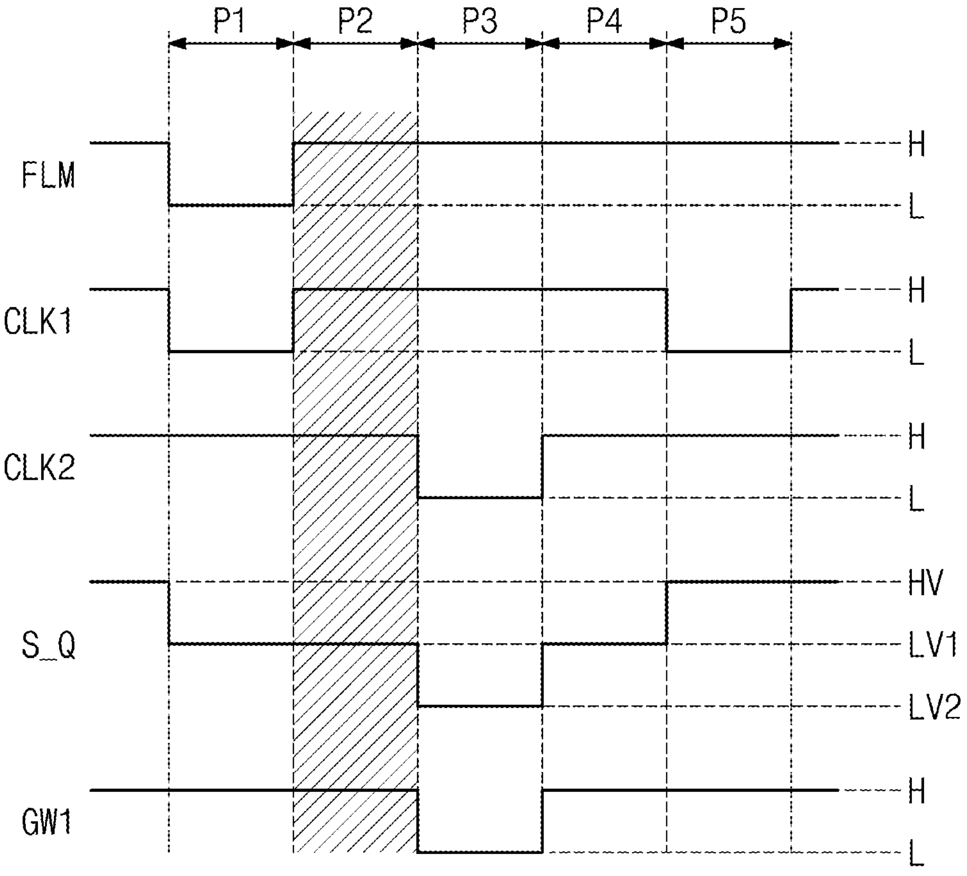

Referring to FIGS. 8B and 9B, during a second period P2, each of the start signal FLM, the first clock signal CLK1, and the second clock signal CLK2 is at the high level H.

When the start signal FLM is at the high level H, the second transistor M2 is turned on and the first transistor M1 is turned off.

When the first clock signal CLK1 is at the high level H, the fifth transistor M5 is turned on, and each of the third transistor M3 and the fourth transistor M4 is turned off.

As the fifth transistor M5 is turned on, the second voltage VGH2 is delivered to the second node QB. The sixth transistor M6 is turned off in response to the second signal of the second node QB.

Because the second transistor M2 is turned on, but the third transistor M3 is turned off, the first signal S_Q of the first node Q may be maintained in a previous state (i.e., the first low level LV1) by the capacitor C1.

Because the seventh transistor M7 is turned on while the first signal S_Q remains at the first low level LV1, the second clock signal CLK2, which is at the high level H, is output to the output terminal OUT through the seventh transistor M7. Accordingly, during the second period P2, the scan signal GW1 is at the high level H.

Figure 8C:
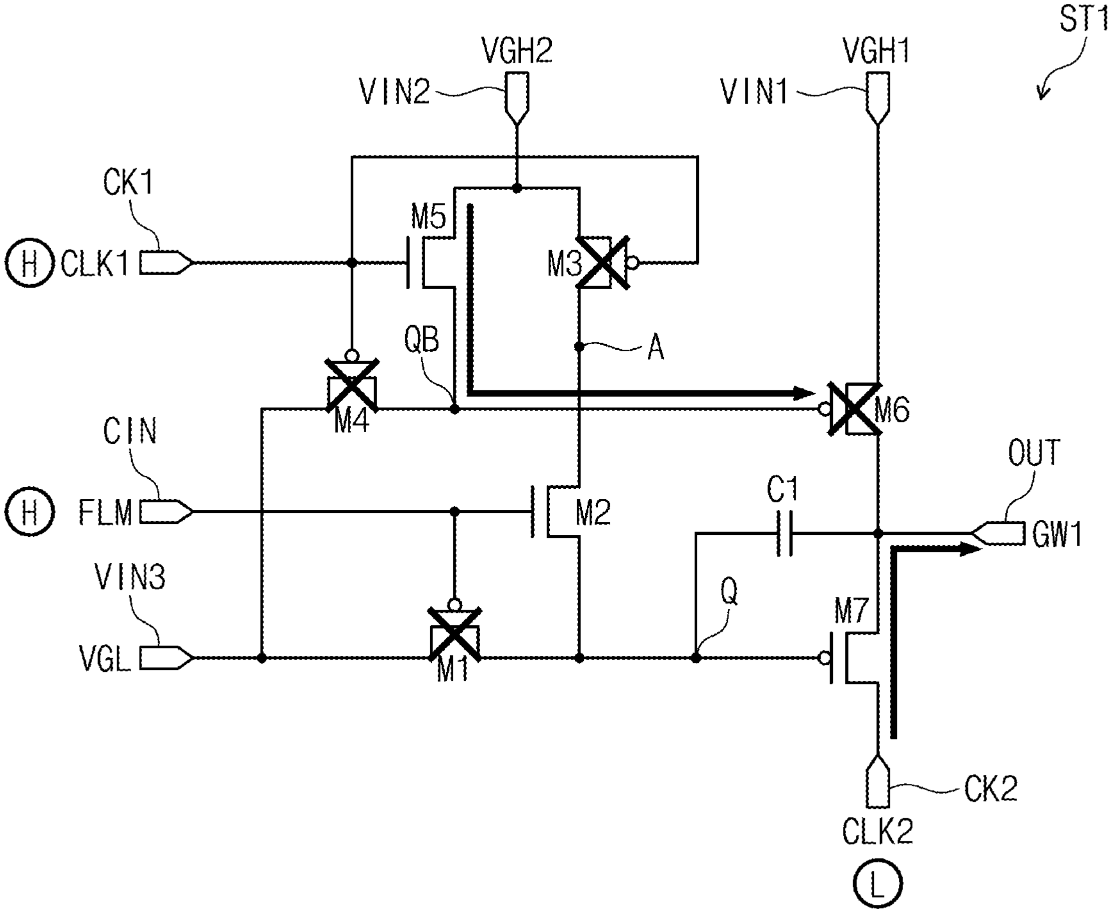
Figure 9C:
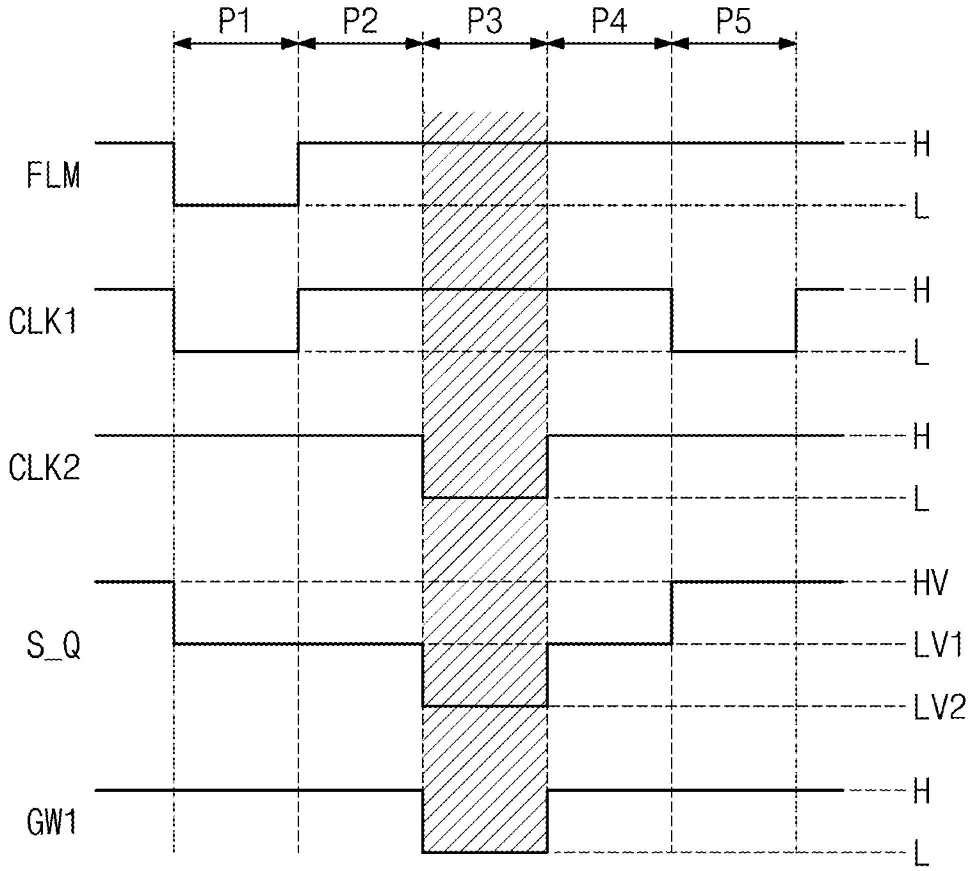

Referring to FIGS. 8C and 9C, during a third period P3, each of the start signal FLM and the first clock signal CLK1 is at the high level H, and the second clock signal CLK2 is at the low level L.

When the start signal FLM is at the high level H, the second transistor M2 is turned on and the third transistor M3 is turned off.

When the first clock signal CLK1 is at the high level H, the fifth transistor M5 is turned on, and each of the third transistor M3 and the fourth transistor M4 is turned off.

When the seventh transistor M7 is turned on during the second period P2, and then the second clock signal CLK2 transitions from the high level H to the low level L during the third period P3, the second clock signal CLK2, which is at the low level L, is output to the output terminal OUT through the seventh transistor M7. Accordingly, during the third period P3, the scan signal GW1 is at the low level L.

As the scan signal GW1 of the output terminal OUT transitions from the high level H to the low level L, the voltage level of the first signal S_Q of the first node Q may be changed to the second low level LV2 that is lower than the first low level LV1 by the first capacitor C1.

As the voltage level of the first signal S_Q becomes lower, the seventh transistor M7 may be completely turned on. Accordingly, during the third period P3, the scan signal GW1 may be maintained at the low level L of the second clock signal CLK2.

Figure 8D:
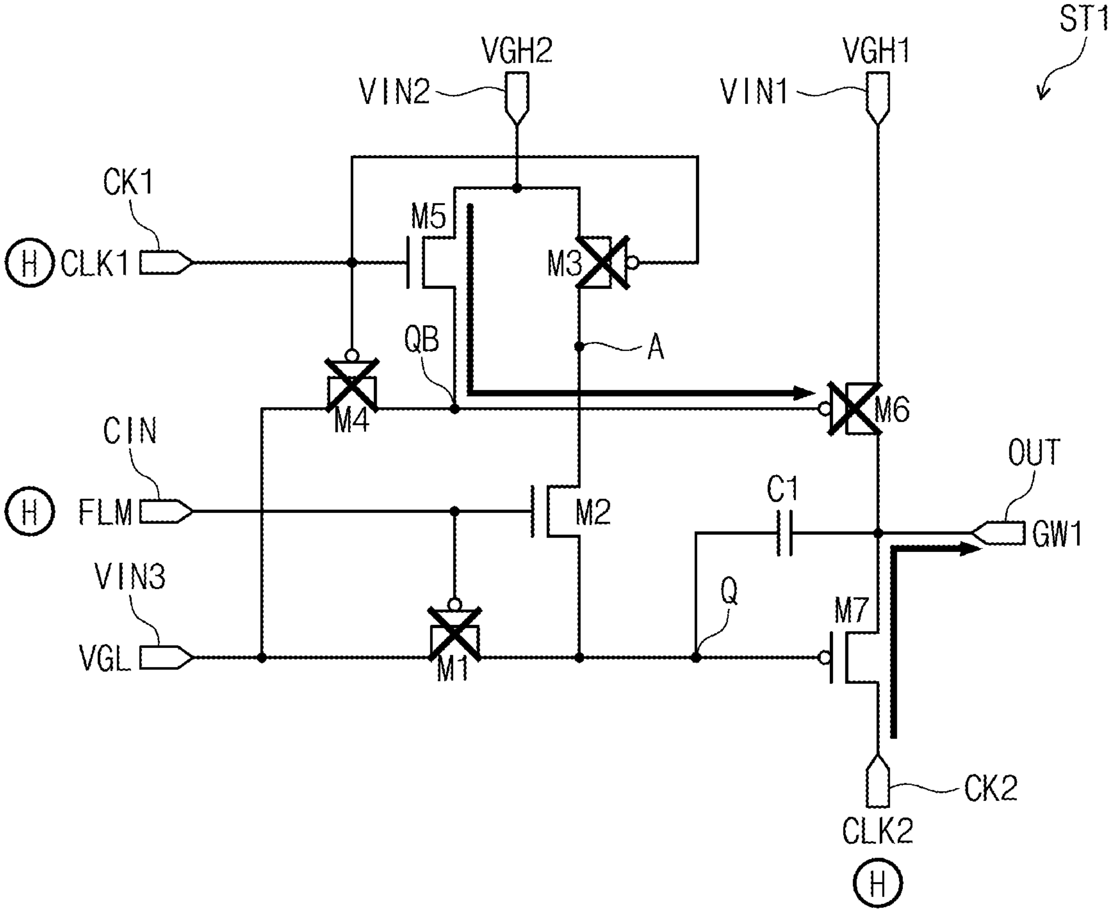
Figure 9D:
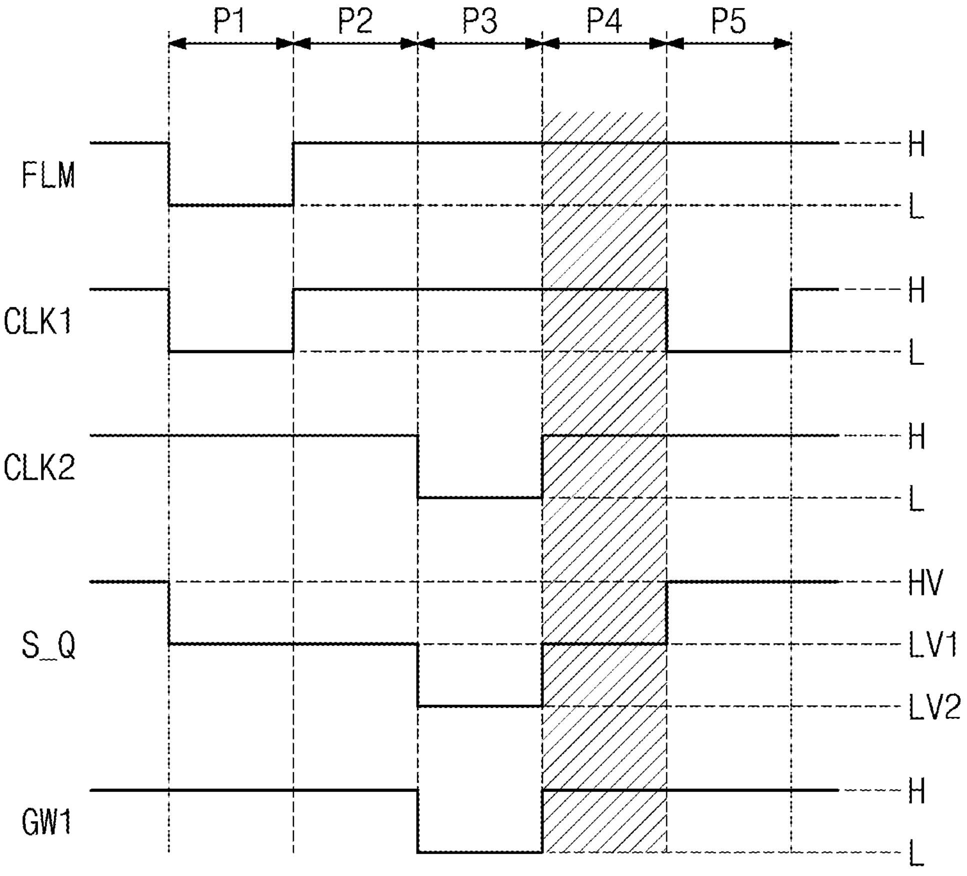

Referring to FIGS. 8D and 9D, during a fourth period P4, each of the start signal FLM, the first clock signal CLK1, and the second clock signal CLK2 is at the high level H.

When the start signal FLM is at the high level H, the second transistor M2 is turned on and the first transistor M1 is turned off.

When the first clock signal CLK1 is at the high level H, the fifth transistor M5 is turned on, and each of the third transistor M3 and the fourth transistor M4 is turned off.

As the fifth transistor M5 is turned on, the second voltage VGH2 is delivered to the second node QB. The sixth transistor M6 is turned off in response to the second signal of the second node QB.

Because the second transistor M2 is turned on, but the third transistor M3 is turned off, the first signal S_Q of the first node Q may be maintained in a previous state (i.e., the first low level LV1) by the capacitor C1.

When the seventh transistor M7 is turned on during the third period P3, and then the second clock signal CLK2 transitions from the low level L to the high level H during the fourth period P4, the second clock signal CLK2, which is at the high level H during the fourth period P4, is output to the output terminal OUT through the seventh transistor M7. Accordingly, during the fourth period P4, the scan signal GW1 is at the high level H.

As the scan signal GW1 of the output terminal OUT transitions from the low level L to the high level H, the voltage level of the first signal S_Q of the first node Q may be changed to the first low level LV1, which is higher than the second low level LV2, by the capacitor C1.

Because the seventh transistor M7 is turned on even though the voltage level of the first signal S_Q is changed to the first low level LV1, the voltage level of the scan signal GW1 during the fourth period P4 may be equal to the high level H of the second clock signal CLK2.

Figure 8E:
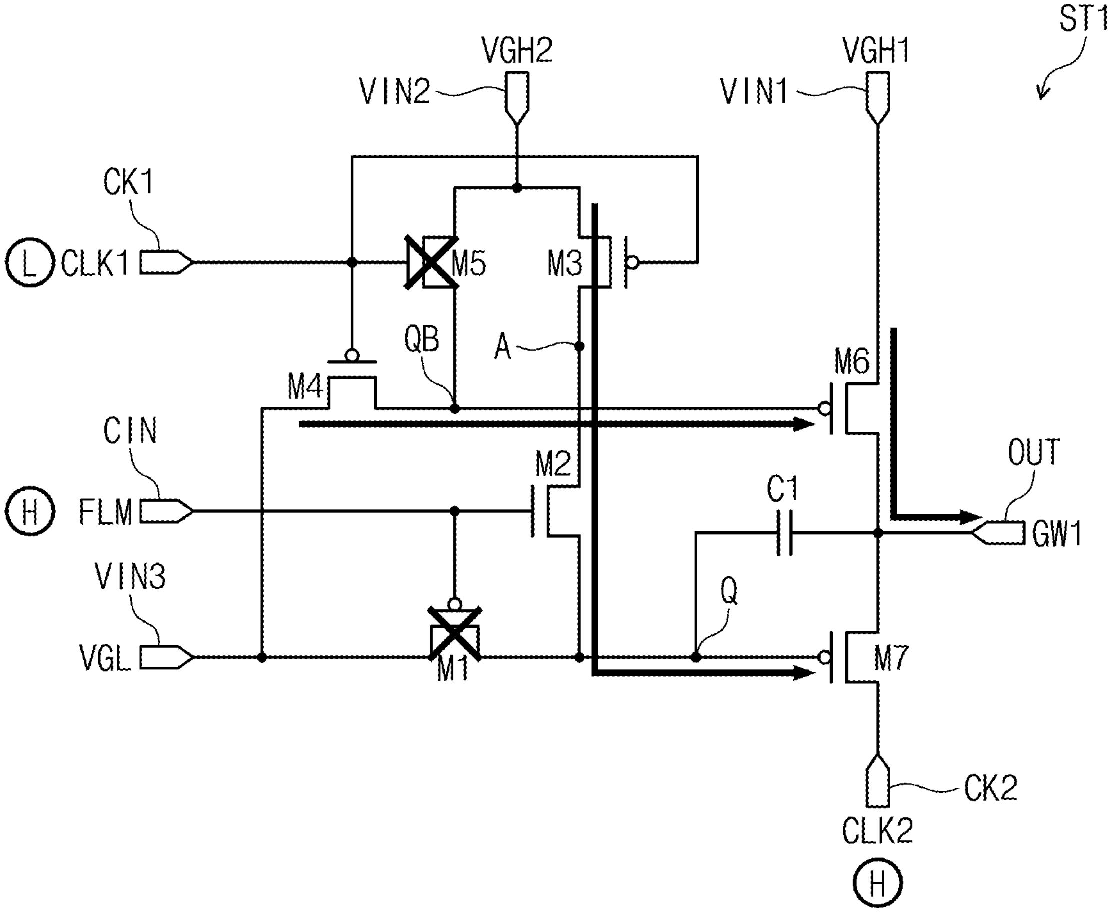
Figure 9E:
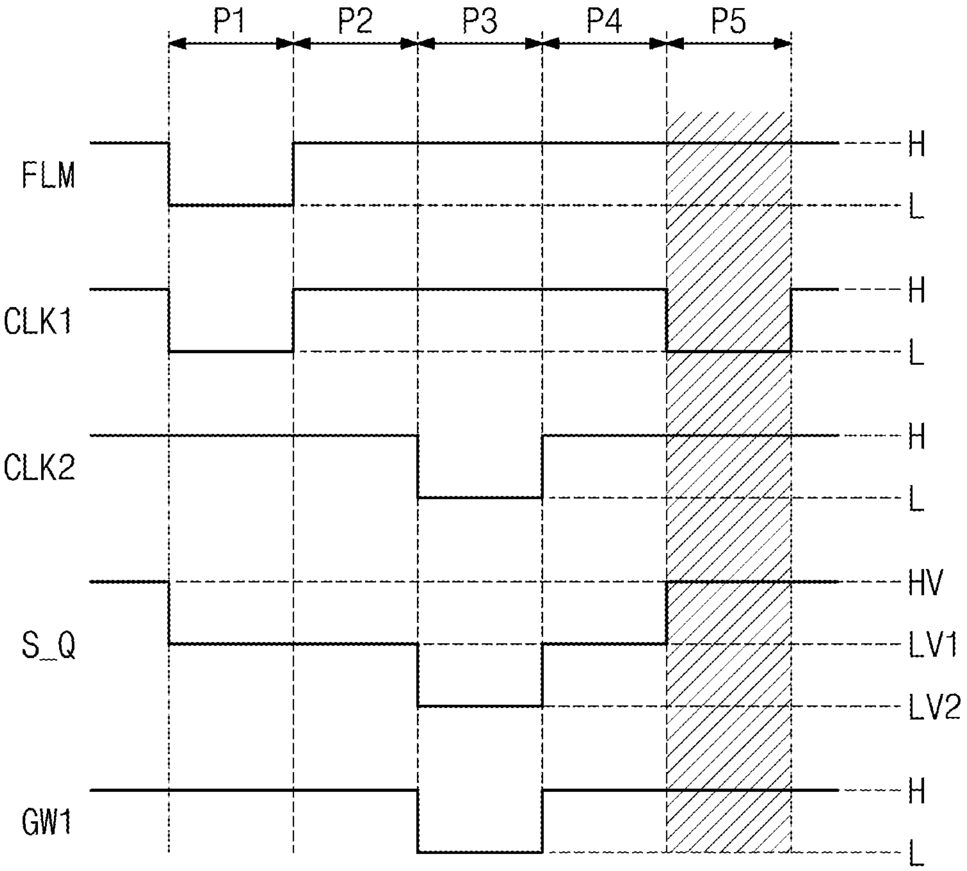

Referring to FIGS. 8E and 9E, during a fifth period P5, each of the start signal FLM and the second clock signal CLK2 is at the high level H, and the first clock signal CLK1 is at the low level L.

When the start signal FLM is at the high level H, the second transistor M2 is turned on and the first transistor M1 is turned off.

When the first clock signal CLK1 is at the low level L, each of the third transistor M3 and the fourth transistor M4 are turned on, and the fifth transistor M5 is turned off.

Even though the third transistor M3 is turned on to deliver the second voltage VGH2 to the second node QB, the fourth transistor M4 is turned on, and thus, the second node QB may be discharged to the third voltage VGL. The sixth transistor M6 may be turned on in response to a second signal of the second node QB.

The first voltage VGH1 may be output to the output terminal OUT through the sixth transistor M6, which is turned on.

In addition, the second voltage VGH2 at a high level may be delivered to the first node Q through the third transistor M3 and the second transistor M2 that are turned on during the fifth period P5. When the voltage level of the first signal S_Q of the first node Q is changed to the high voltage level HV, the seventh transistor M7 is turned off.

Because the scan signal GW1 of the output terminal OUT is at the high level H during the fourth period P4, the scan signal GW1 may be maintained at the high level H by the capacitor C1 during the fifth period P5.

During the fifth period P5, the second signal of the second node QB may be stably maintained at the first low level LV1. As the second signal of the second node QB is maintained at a constant voltage level, the turn-on state of the sixth transistor M6 may be stably maintained. As a result, the scan signal GW1 may be stably maintained at the high level H.

Throughout the first to fifth periods P1-P5, the second voltage VGH2 may be delivered to the first node Q and the second node QB and may be used to turn off the sixth transistor M6 and the seventh transistor M7. Accordingly, the second voltage VGH2 may be set to a voltage level that is sufficient to turn off the sixth transistor M6 and the seventh transistor M7. For example, the second voltage VGH2 may have a voltage level that is lower than the first voltage VGH1 by about 1~2 V. The power consumption of the driving stage ST1 may be reduced by setting the second voltage VGH2 to a voltage level that is lower than the first voltage VGH1.

Figure 10:
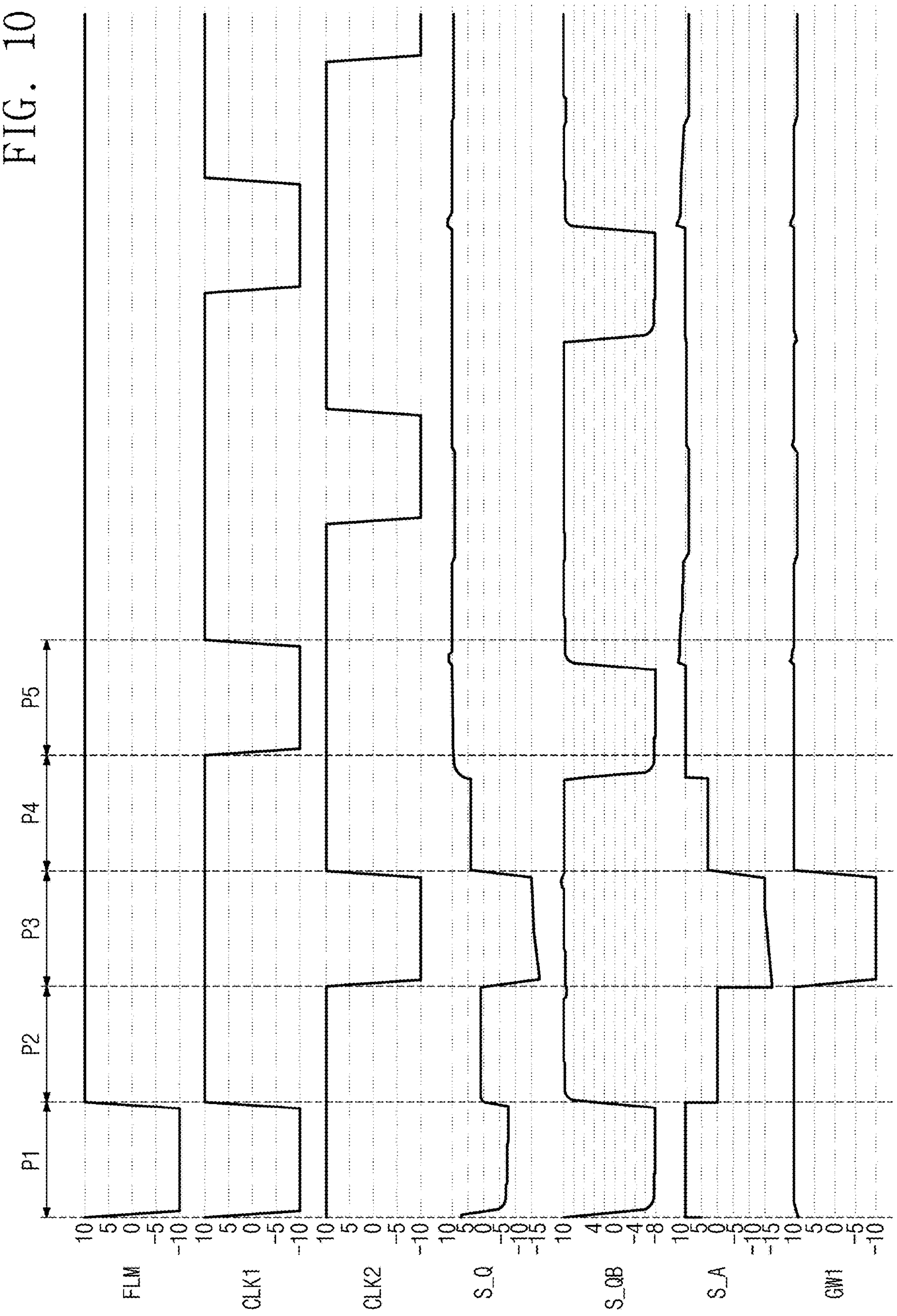
FIG. 10 is a diagram illustrating a result of simulating an operation of a driving stage, according to an embodiment of the present invention.

FIG. 10 is a diagram illustrating the result of simulating an operation of the driving stage ST1, according to an embodiment of the present invention.

In FIG. 10, numbers described on a vertical axis indicate voltage levels corresponding to the start signal FLM, the first clock signal CLK1, the second clock signal CLK2, the first signal S_Q of the first node Q, a second signal S_QB of the second node QB, and a third signal S_A of the third node A, respectively. However, the present invention is not limited thereto.

Referring to FIGS. 7 and 10, it may be seen that the driving stage ST1 operates in the same manner as described in FIGS. 8A to 8E and 9A to 9E during each of the first to fifth periods P1 to P5.

During each of the first, second, fourth and fifth periods P1, P2, P4, and P5, the driving stage ST1 outputs the scan signal GW1 at a high level. During the third period P3, the driving stage ST1 outputs the scan signal GW1 at a low level.

While the start signal FLM remains at a high level, (i.e., during each of the second, third, fourth and fifth periods P2, P3, P4, and P5), the second transistor M2 is turned on. When the turn-on state of the second transistor M2 is prolonged, the stress of the second transistor M2 may increase depending on a voltage difference between the drain electrode and the source electrode of the second transistor M2 (i.e., a voltage difference between the third node A and the first node Q). As shown in FIG. 10, the third signal S_A of the third node A may have a waveform similar to a waveform of the first signal S_Q of the first node Q. Accordingly, because the voltage difference between the drain electrode and the source electrode of the second transistor M2 is not large, damage to the second transistor M2 may be prevented.

Figure 11:
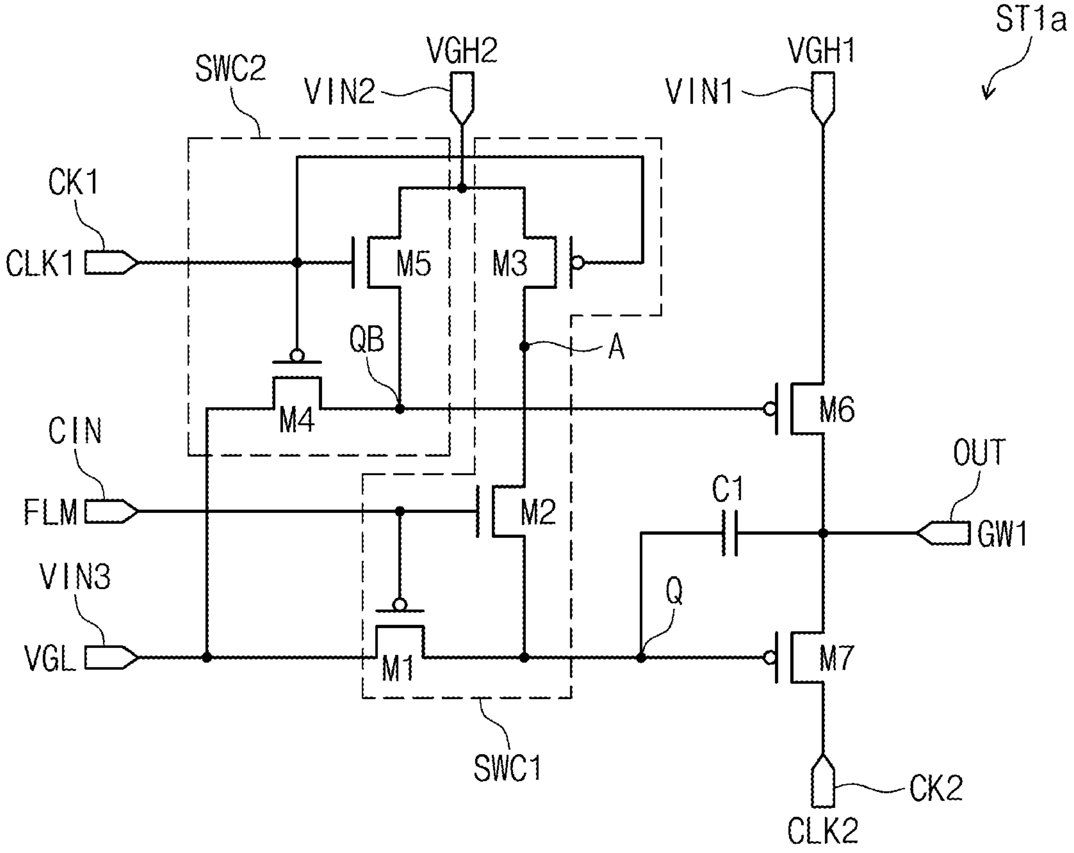
FIG. 11 is a circuit diagram of a driving stage, according to an embodiment of the present invention.

FIG. 11 is a circuit diagram of a driving stage ST1*a*, according to an embodiment of the present invention.

Referring to FIG. 11, the driving stage ST1*a* includes a first switching circuit SWC1, a second switching circuit SWC2, the first output transistor M6, the second output transistor M7, and the capacitor C1.

The first switching circuit SWC1 includes the first, second, and third transistors M1, M2, and M3. The second switching circuit SWC2 includes the fourth and fifth transistors M4 and M5.

The first to fifth transistors M1, M2, M3, M4, and M5, the first output transistor M6, the second output transistor M7, and the capacitor C1 are the same as the first to fifth transistors M1, M2, M3, M4, and M5, the first output transistor M6, the second output transistor M7, and the capacitor C1 shown in FIG. 7, and thus, additional descriptions that may be redundant are omitted or briefly discussed to avoid redundancy.

The first switching circuit SWC1 is connected to the second voltage terminal VIN2, the third voltage terminal VIN3, the first clock terminal CK1 and the carry input terminal CIN. The first switching circuit SWC1 outputs a first signal to the first node Q in response to the first clock signal CLK1, which is transmitted to the first clock terminal CK1, and the start signal FLM, which is transmitted to the carry input terminal CIN.

The first switching circuit SWC1 delivers either the second voltage VGH2 or the third voltage VGL to the first node Q in response to the first clock signal CLK1 and the start signal FLM.

The second switching circuit SWC2 is connected to the second voltage terminal VIN2, the third voltage terminal VIN3, and the first clock terminal CK1. The second switching circuit SWC2 outputs the second signal to the second node QB in response to the first clock signal CLK1 that is transmitted to the first clock terminal CK1.

The second switching circuit SWC2 delivers either the second voltage VGH2 or the third voltage VGL to the second node QB in response to the first clock signal CLK1.

Although an embodiment of the present invention has been described for illustrative purposes, those skilled in the art will appreciate that various modifications and substitutions may be made to an embodiment of the present invention, without departing from the scope and spirit of the present invention.

According to an embodiment of the present invention, a scan driving circuit including the minimum number of transistors and capacitors may be implemented. Accordingly, a circuit area of the scan driving circuit may be minimized. As the circuit area of the scan driving circuit is minimized, the bezel area of the electronic device may be minimized. Moreover, power consumption may be reduced by lowering a voltage level of a voltage that is for an internal operation of the scan driving circuit.

While the present disclosure has been described with reference to embodiments thereof, it will be understood to those of ordinary skill in the art that various changes in form and details may be made thereto without departing from the spirit and scope of the present invention.

What is claimed is:

1. A scan driving circuit comprising:

a switching circuit configured to deliver a third voltage to a first node in response to a carry signal and a first clock signal and to deliver the third voltage to a second node in response to the first clock signal;

a first output transistor connected between a first voltage terminal and an output terminal, and configured to operate in response to a second signal of the second node, wherein the first voltage terminal receives a first voltage; and a second output transistor connected between the output terminal and a second clock terminal, and configured to operate in response to a first signal of the first node.

2. The scan driving circuit of claim 1, wherein the third voltage is a direct current (DC) voltage for turning on each of the first output transistor and the second output transistor.

3. The scan driving circuit of claim 1, wherein the switching circuit delivers one of a second voltage or the third voltage to the first node in response to the carry signal and the first clock signal, and delivers one of the second voltage or the third voltage to the second node in response to the first clock signal.

4. The scan driving circuit of claim 3, wherein the second voltage is lower than or equal to the first voltage, and the third voltage is lower than the second voltage.

5. The scan driving circuit of claim 3, wherein the switching circuit includes:

a first transistor connected between a third voltage terminal, which receives the third voltage, and the first node, and including a gate electrode that is connected to a carry terminal that receives the carry signal;

a second transistor connected between a third node and the first node and including a gate electrode that is connected to the carry terminal;

a third transistor connected between a second voltage terminal, which receives the second voltage, and the third node, and including a gate electrode that is connected to a first clock terminal that receives the first clock signal;

a fourth transistor connected between the third voltage terminal and the second node and including a gate electrode that is connected to the first clock terminal; and a fifth transistor connected between the second voltage terminal and the second node and including a gate electrode that is connected to the first clock terminal.

6. The scan driving circuit of claim 5, wherein the first transistor and the second transistor are transistors having different types from each other.

7. The scan driving circuit of claim 5, wherein the fourth transistor and the fifth transistor are transistors having different types from each other.

8. The scan driving circuit of claim 1, further comprising:

a capacitor connected between the first node and the output terminal.

9. The scan driving circuit of claim 1, wherein the first clock signal and a second clock signal have frequencies a same as each other and different phases from each other.

10. A scan driving circuit comprising:

a first switching circuit configured to deliver one of a second voltage or a third voltage to a first node in response to a carry signal and a first clock signal;

a second switching circuit configured to deliver one of the second voltage or the third voltage to a second node in response to the first clock signal;

a first output transistor connected between a first voltage terminal and an output terminal, and configured to operate in response to a second signal of the second node, wherein the first voltage terminal receives a first voltage; and a second output transistor connected between the output terminal and a second clock terminal and configured to operate in response to a first signal of the first node.

11. The scan driving circuit of claim 10, wherein the third voltage is a direct current (DC) voltage for turning on each of the first output transistor and the second output transistor.

12. The scan driving circuit of claim 10, wherein the second voltage is lower than or equal to the first voltage, and the third voltage is lower than the second voltage.

13. The scan driving circuit of claim 10, wherein the first switching circuit includes:

a first transistor connected between a third voltage terminal, which receives the third voltage, and the first node, and including a gate electrode that is connected to a carry terminal that receives the carry signal;

a second transistor connected between a third node and the first node and including a gate electrode that is connected to the carry terminal; and a third transistor connected between a second voltage terminal, which receives the second voltage, and the third node, and including a gate electrode that is connected to a first clock terminal that receives the first clock signal.

14. The scan driving circuit of claim 13, wherein the second switching circuit includes:

a fourth transistor connected between the third voltage terminal and the second node and including a gate electrode that is connected to the first clock terminal; and a fifth transistor connected between the second voltage terminal and the second node and including a gate electrode that is connected to the first clock terminal.

15. An electronic device comprising:

a display panel including a pixel;

a scan driving circuit configured to provide a scan signal to the pixel;

a driving controller configured to provide a start signal, a first clock signal, and a second clock signal to the scan driving circuit; and a voltage generator configured to provide a first voltage, a second voltage, and a third voltage to the scan driving circuit, wherein the scan driving circuit includes:

a switching circuit configured to deliver the third voltage to a first node in response to the start signal and the first clock signal, and to deliver the third voltage to a second node in response to the first clock signal;

a first output transistor connected between a first voltage terminal, which receives the first voltage, and an output terminal that outputs the scan signal, and configured to operate in response to a second signal of the second node; and a second output transistor connected between the output terminal and a second clock terminal that receives the second clock signal, and configured to operate in response to a first signal of the first node.

16. The electronic device of claim 15, wherein the third voltage is a direct current (DC) voltage for turning on each of the first output transistor and the second output transistor.

17. The electronic device of claim 15, wherein the switching circuit delivers one of the second voltage or the third voltage to the first node in response to the start signal and the first clock signal, and delivers one of the second voltage or the third voltage to the second node in response to the first clock signal.

18. The electronic device of claim 17, wherein the second voltage is lower than or equal to the first voltage, and the third voltage is lower than the second voltage.

19. The electronic device of claim 17, wherein the switching circuit includes:

a first transistor connected between a third voltage terminal, which receives the third voltage, and the first node, and including a gate electrode that is connected to a carry terminal that receives the start signal;

a second transistor connected between a third node and the first node, and including a gate electrode that is connected to the carry terminal;

a third transistor connected between a second voltage terminal, which receives the second voltage, and the third node, and including a gate electrode that is connected to a first clock terminal that receives the first clock signal;

a fourth transistor connected between the third voltage terminal and the second node, and including a gate electrode that is connected to the first clock terminal; and a fifth transistor connected between the second voltage terminal and the second node, and including a gate electrode that is connected to the first clock terminal.

20. The electronic device of claim 19, wherein the first transistor and the second transistor are transistors having different types from each other, and wherein the fourth transistor and the fifth transistor are transistors having different types from each other.

* * * * *